US008171027B1

(12) United States Patent
Andrade-Cetto

(10) Patent No.: US 8,171,027 B1
(45) Date of Patent: May 1, 2012

(54) CLUSTERING FOR ADDITIVE TREES

(75) Inventor: Lucio Andrade-Cetto, Natick, MA (US)

(73) Assignee: The Mathworks, Inc., Natick, MA (US)

( * ) Notice: Subject to any disclaimer, the term of this patent is extended or adjusted under 35 U.S.C. 154(b) by 288 days.

(21) Appl. No.: 12/608,536

(22) Filed: Oct. 29, 2009

Related U.S. Application Data

(60) Provisional application No. 61/155,344, filed on Feb. 25, 2009, provisional application No. 61/186,634, filed on Jun. 12, 2009.

(51) Int. Cl.
*G06F 7/00* (2006.01)
(52) U.S. Cl. .................................. 707/737; 704/245
(58) Field of Classification Search .......... 707/737
See application file for complete search history.

(56) References Cited

U.S. PATENT DOCUMENTS

| | | | | |
|---|---|---|---|---|
| 7,451,065 | B2 * | 11/2008 | Pednault et al. | 703/2 |
| 2003/0176931 | A1 * | 9/2003 | Pednault et al. | 700/31 |
| 2008/0301316 | A1 * | 12/2008 | Alpern et al. | 709/231 |

OTHER PUBLICATIONS

Dudoit S, Fridlyan J, A prediction-based resampling method for estimating the number of clusters in a dataset. Genome Biology, 3(7):research0036.1-0036.21, 2002.
Williams GW, Cooper M, An examination of procedures for determining the number of clusters in a data set. Psychometrika 30:2 pp. 159-179, 1985.

\* cited by examiner

*Primary Examiner* — Fazlul Quader
(74) *Attorney, Agent, or Firm* — Harrity & Harrity, LLP

(57) ABSTRACT

A computing device-implemented method includes receiving an additive tree; assigning data associated with the additive tree to one or more initial clusters; partitioning the additive tree into one or more pairs of additive sub-trees corresponding to one or more binary segmentations; computing a set that includes partitions resulting from a combination of the one or more initial clusters and the one or more pairs of additive sub-trees; evaluating one or more partitions of the set with one or more cluster validation criteria; storing one or more evaluation results for the one or more partitions; selecting at least one partition from the one or more partitions of the set that satisfies the one or more cluster validation criteria, where the at least one partition is associated with an optimal evaluation result; and removing at least one of the binary segmentations that corresponds to the at least one partition.

47 Claims, 26 Drawing Sheets

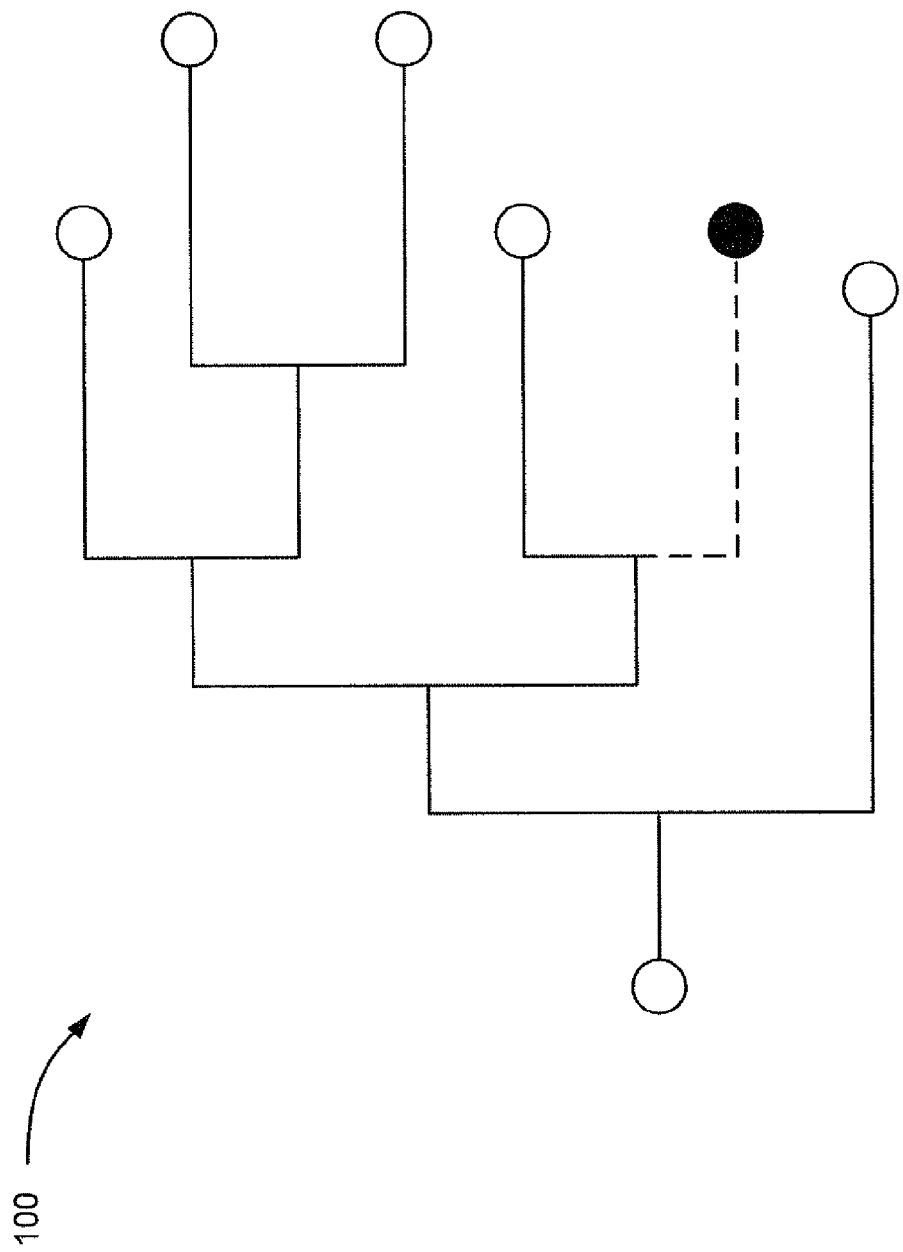

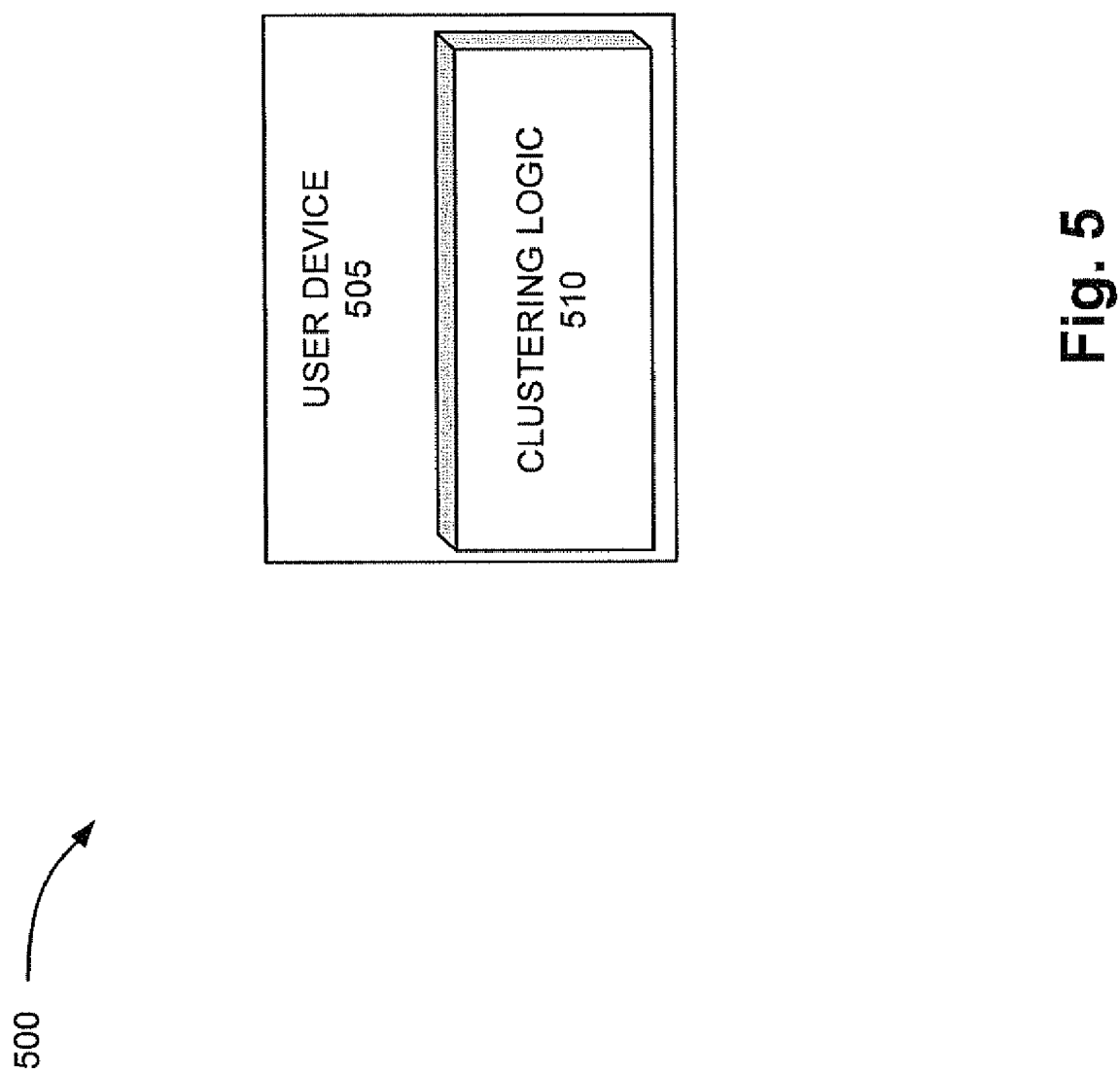

CLUSTERING FOR ADDITIVE TREES

CROSS REFERENCE TO RELATED APPLICATIONS

This application claims priority under 35 U.S.C. §119 based on U.S. provisional application No. 61/155,344, filed Feb. 25, 2009, and U.S. provisional application No. 61/186,634, filed on Jun. 12, 2009, the disclosures of which are hereby incorporated by reference herein in their entirety.

BACKGROUND

Data representation and data analysis can provide invaluable information within various disciplines of study. While various approaches to represent and analyze data exist, tree models, such as, additive trees, have become one way to represent and analyze data. The additive tree may correspond to a tree in which a non-negative weight may be attached to each link. A distance between two nodes of the additive tree may be defined as a sum of the weights assigned to the links constituting a path that connects the two nodes. Additive tree distances may satisfy the so-called additive inequality or four point condition.

However, in many types of clustering techniques, errors may exist. For example, decision errors may cause more clusters or fewer clusters to be present as compared to a number of clusters that actually exist in the data. To address these issues, cluster validation procedures may be implemented.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 2A-2K are diagrams illustrating an exemplary binary segmentation of an additive tree;

FIG. 5 illustrates an exemplary environment that provides cluster validation according to an exemplary implementation described herein;

DETAILED DESCRIPTION

The following detailed description refers to the accompanying drawings. The same reference numbers in different drawings may identify the same or similar elements. Also, the following description does not limit the invention.

Figure 1:
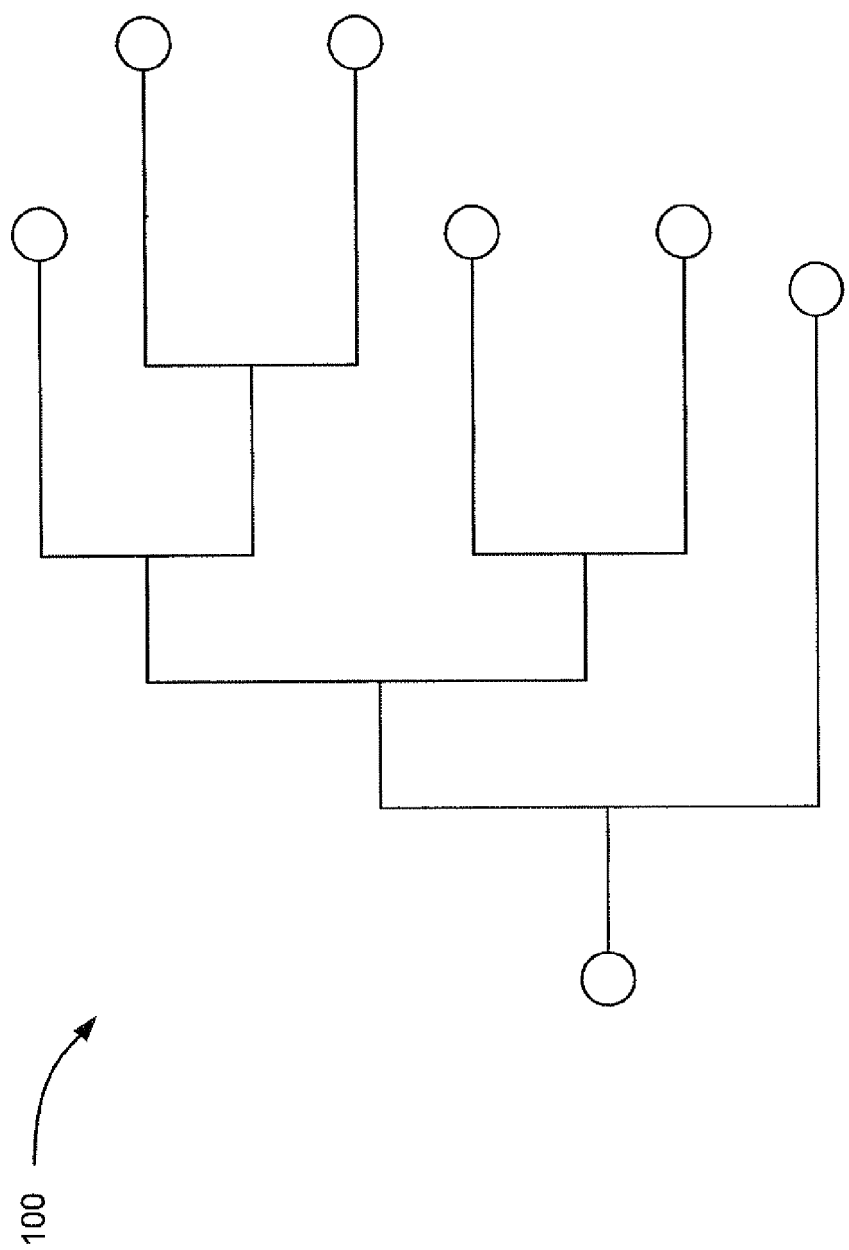
FIG. 1 is a diagram illustrating an exemplary additive tree.

An additive tree can include a tree in which a non-negative weight may be attached to each link and where the pairwise distances between two nodes may be defined as a sum of the weights assigned to the links constituting a path that connects the two nodes. FIG. 1 is a diagram illustrating an exemplary additive tree 100. In one characterization, additive tree 100 may be considered an unrooted additive tree that associates seven nodes. In another characterization, additive tree 100 may be considered a rooted additive tree that associates six nodes to a common ancestor node.

An additive tree may include, but is not limited to, for example, an evolutionary tree, a dendrogram, a cladogram, a phenogram, or a phylogram. The additive tree may represent various types of data, such as, for example, biological samples, proximity data, behavioral science data, numerical sequences, or another type of data set where there may be similarity or dissimilarity between data members within the data set.

Biological sample may refer to and may include, a variety of taxonomies, such as, for example, a phylum, a species, a family, a sub-family, or other representations not necessarily associated from the "tree of life," such as, for example, homologous protein sequences from a protein family, mutated sequences in oncogenes, or other types of biological sequences, viruses (e.g., polio, flu strains), or other types of genetic entities (e.g., bacteria), synthesized or non-biological entities or sequences, or the like.

Figure 2A:
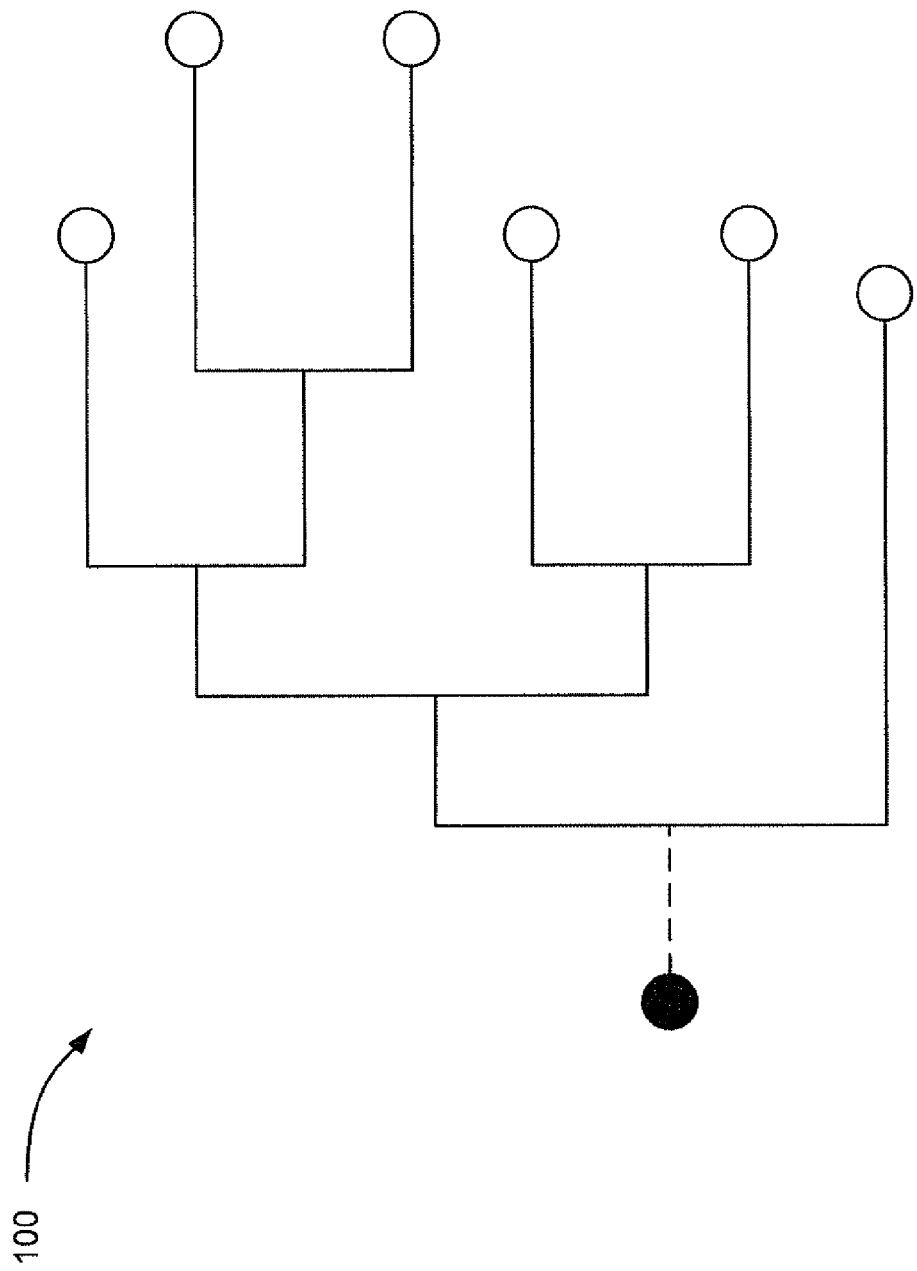
Figure 2B:
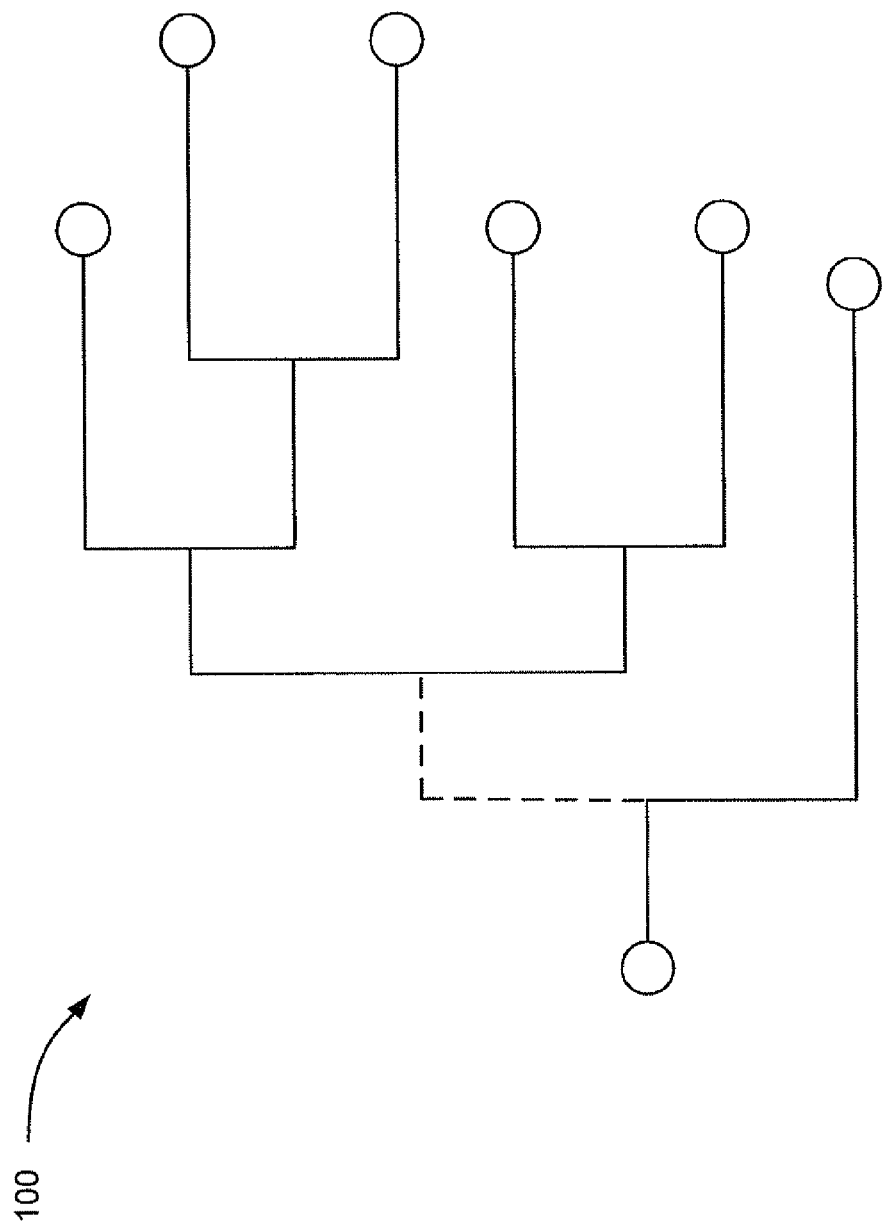
Figure 2C:
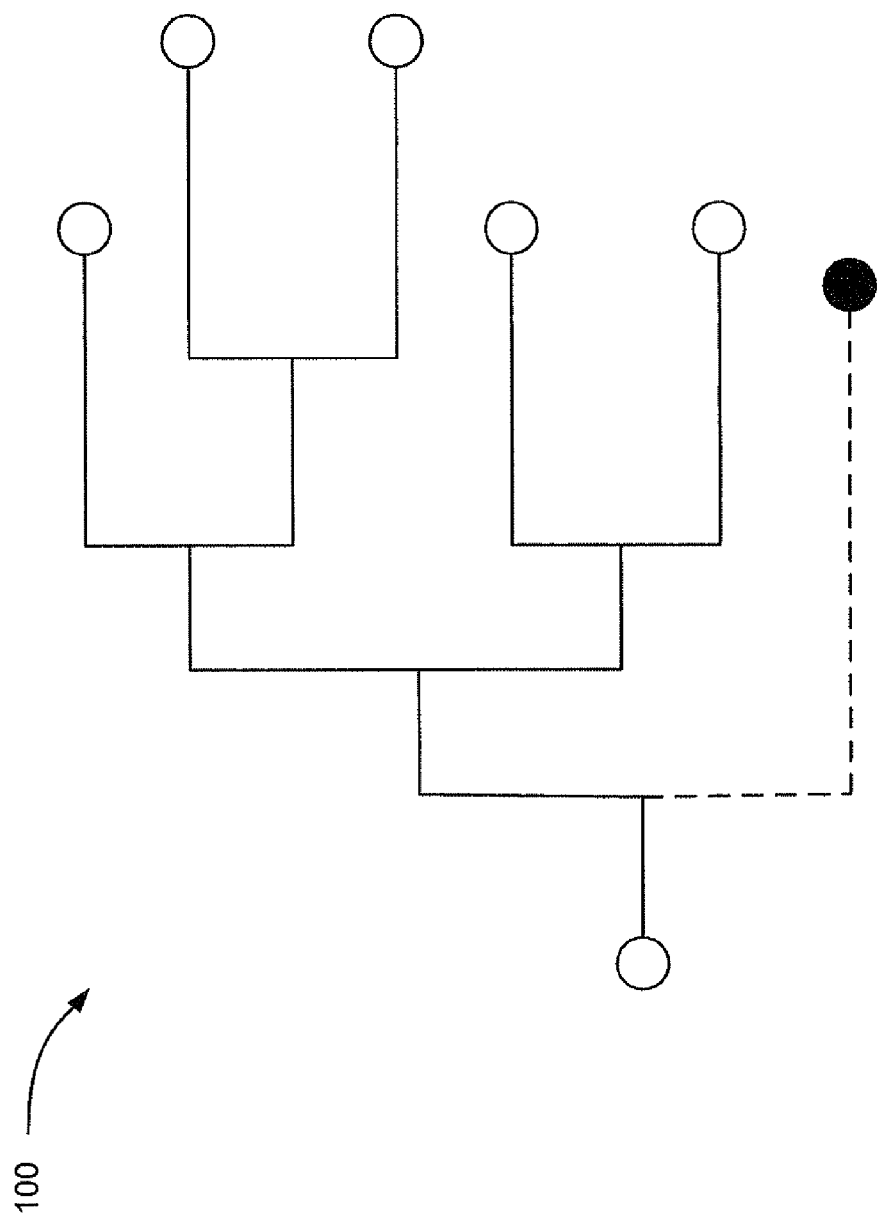
Figure 2D:
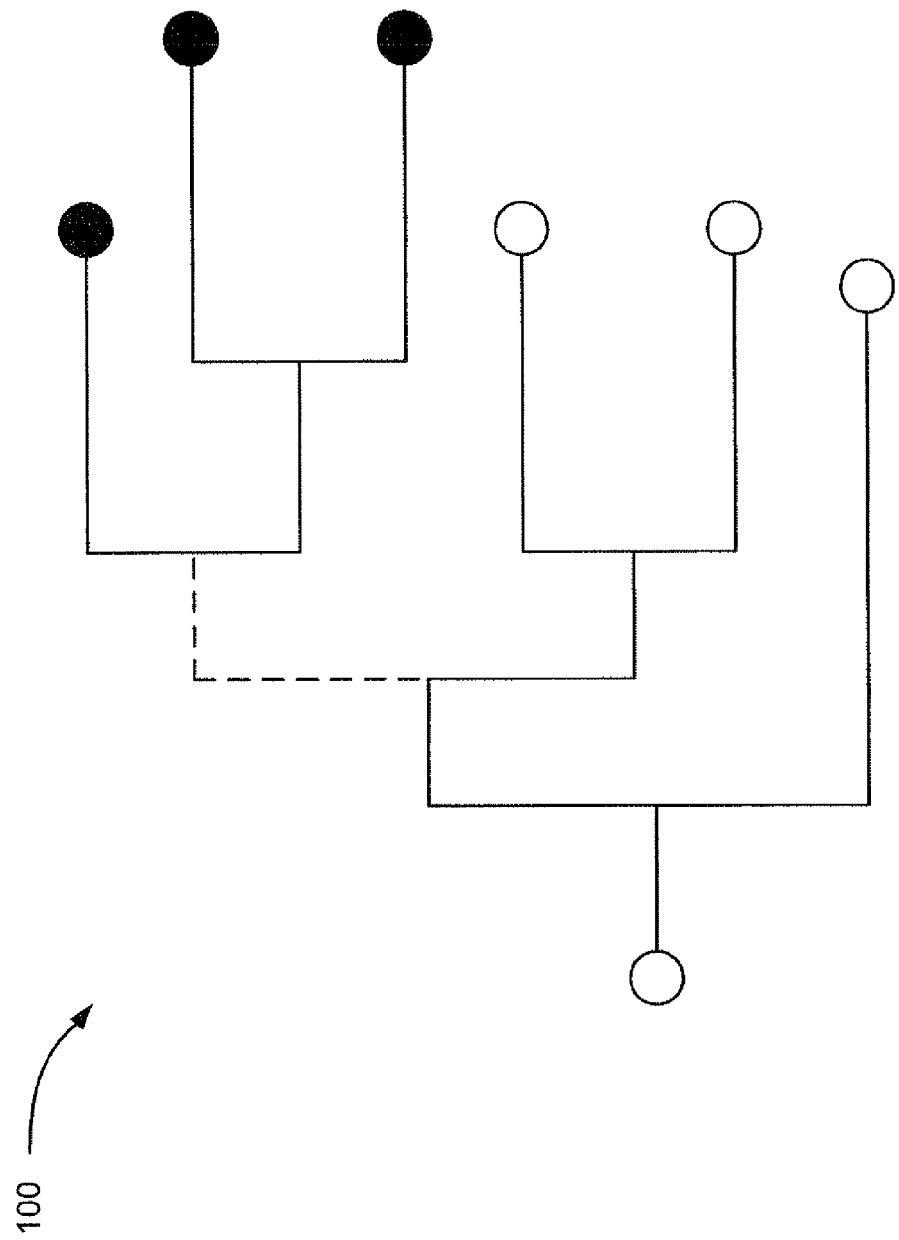
Figure 2E:
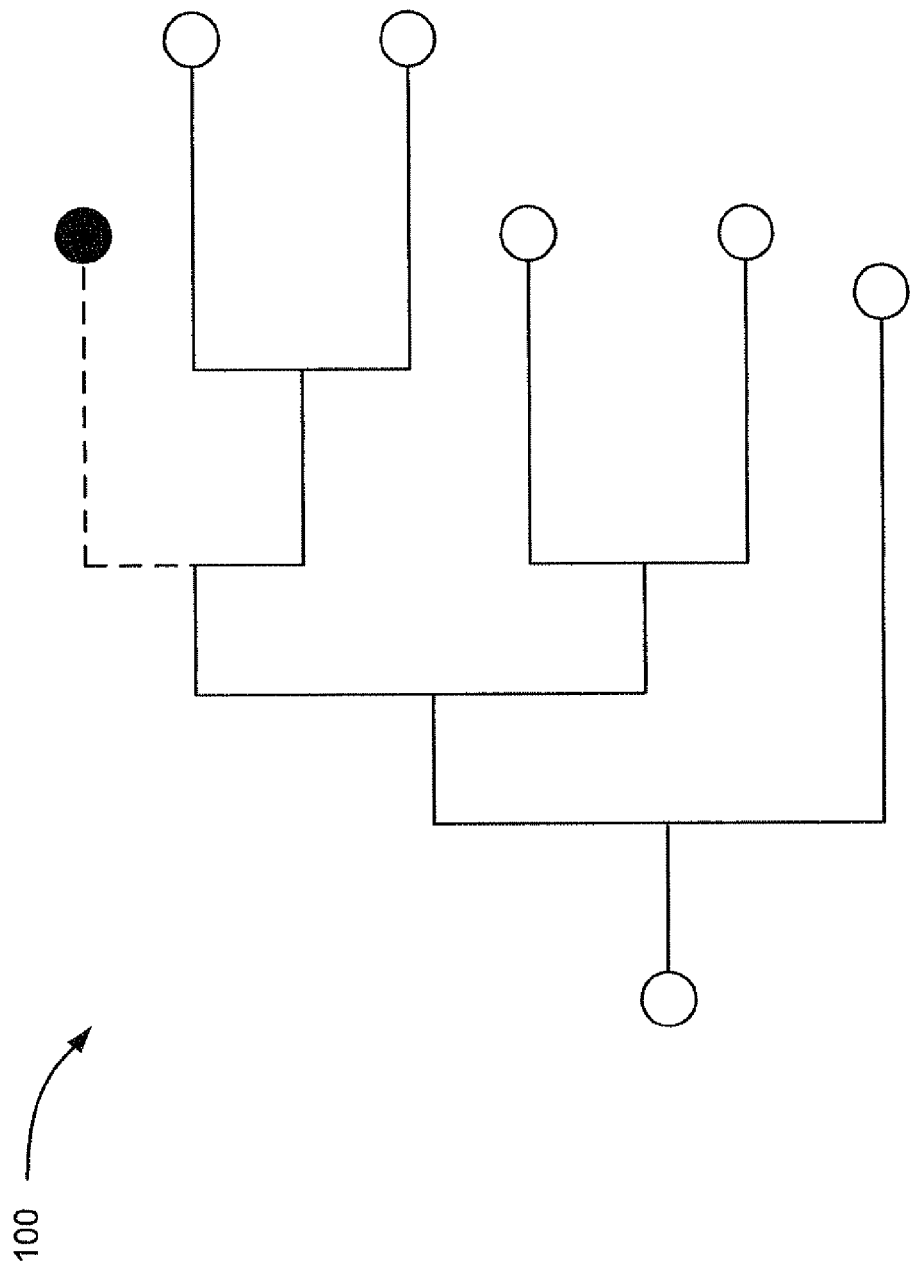
Figure 2F:
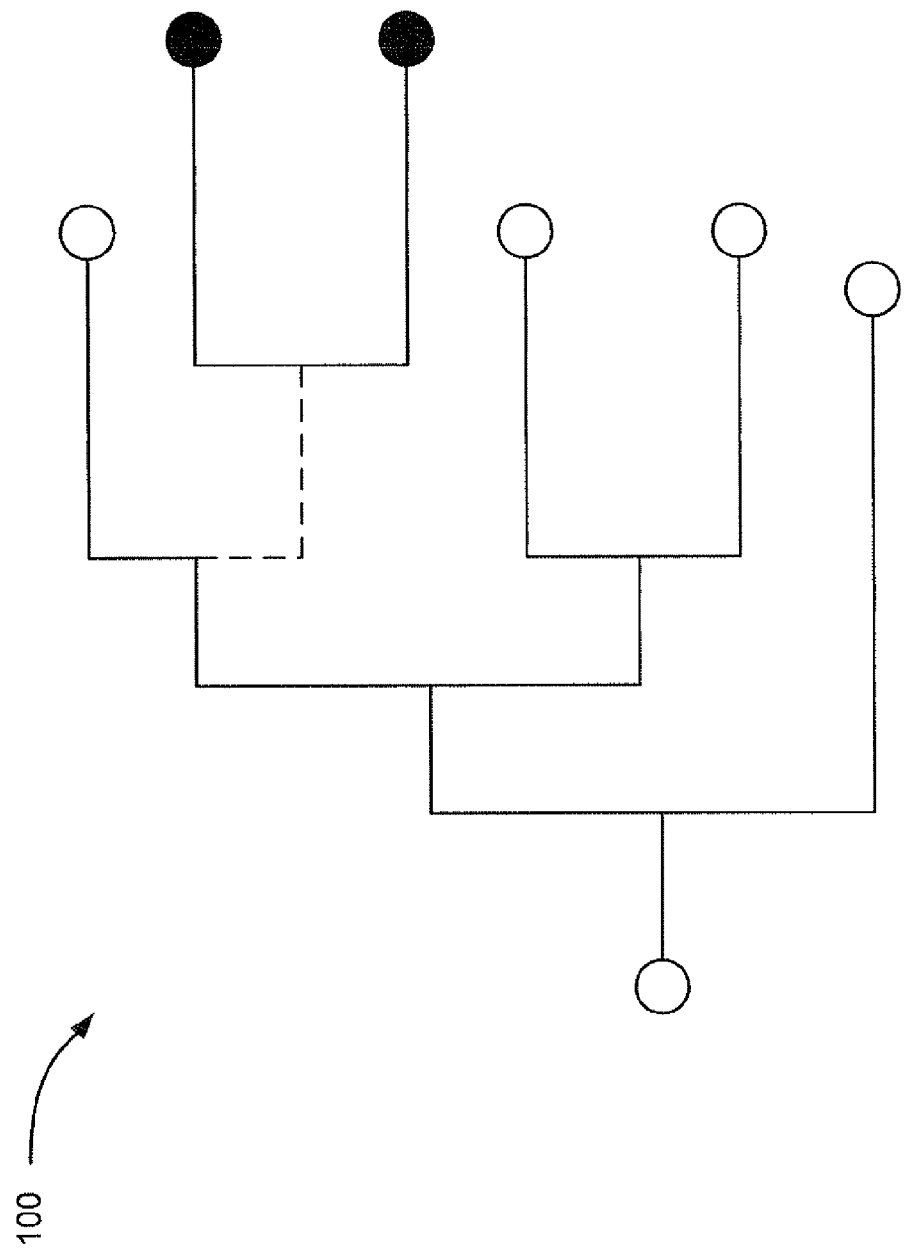
Figure 2G:
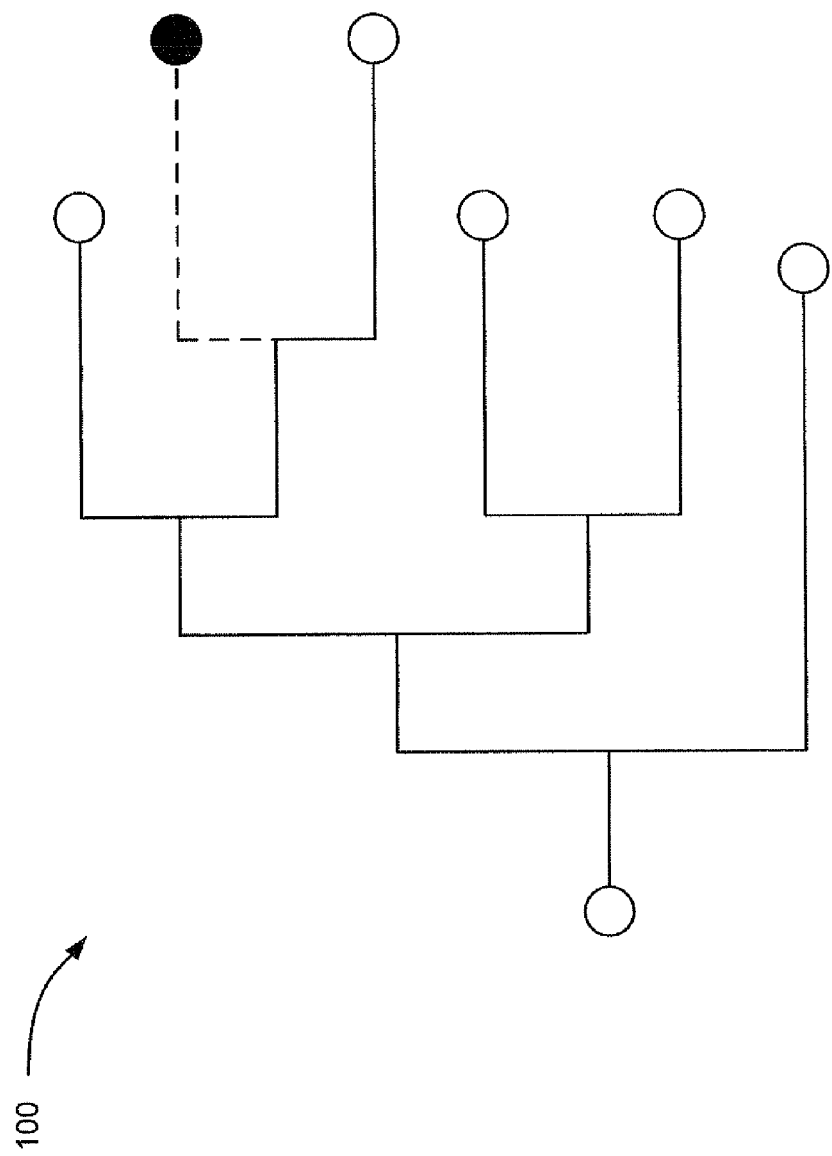
Figure 2H:
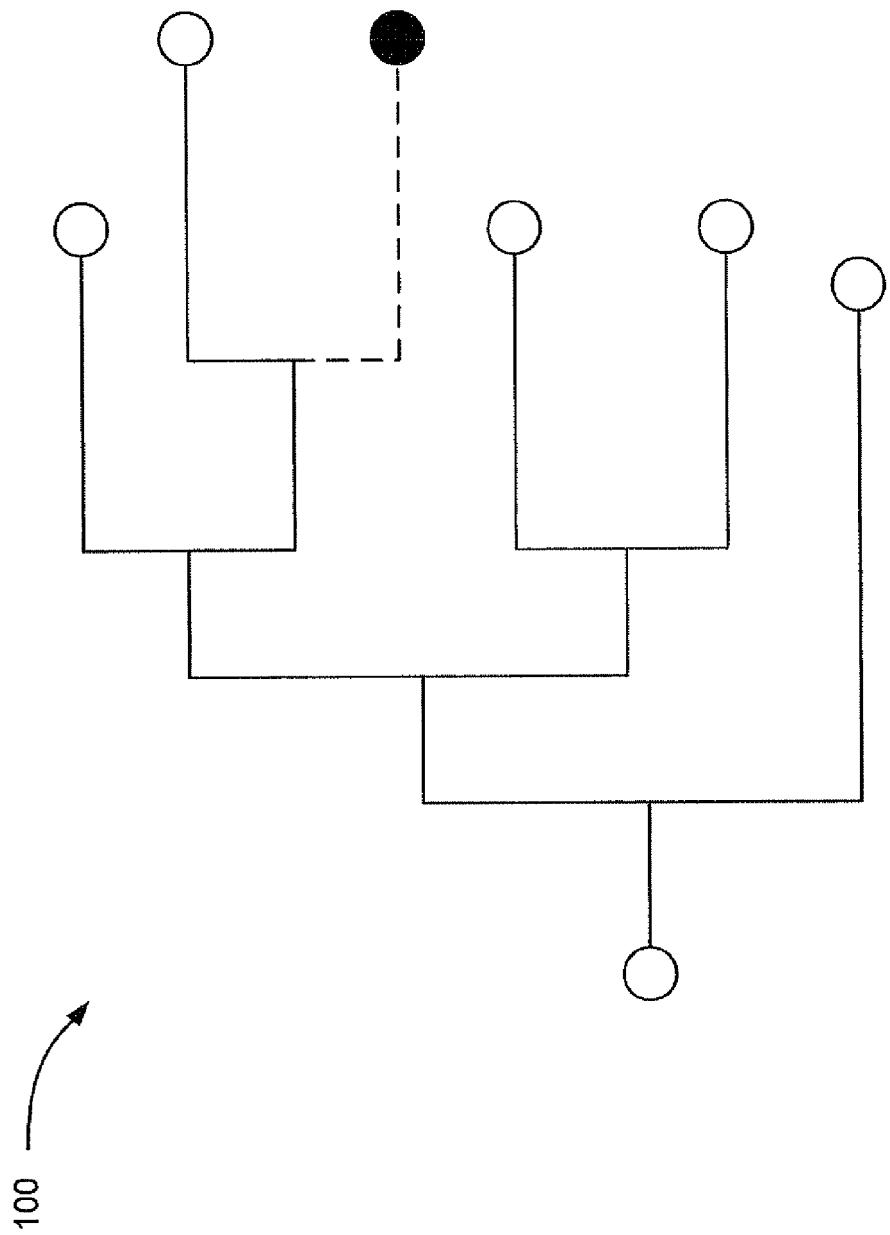
Figure 2I:
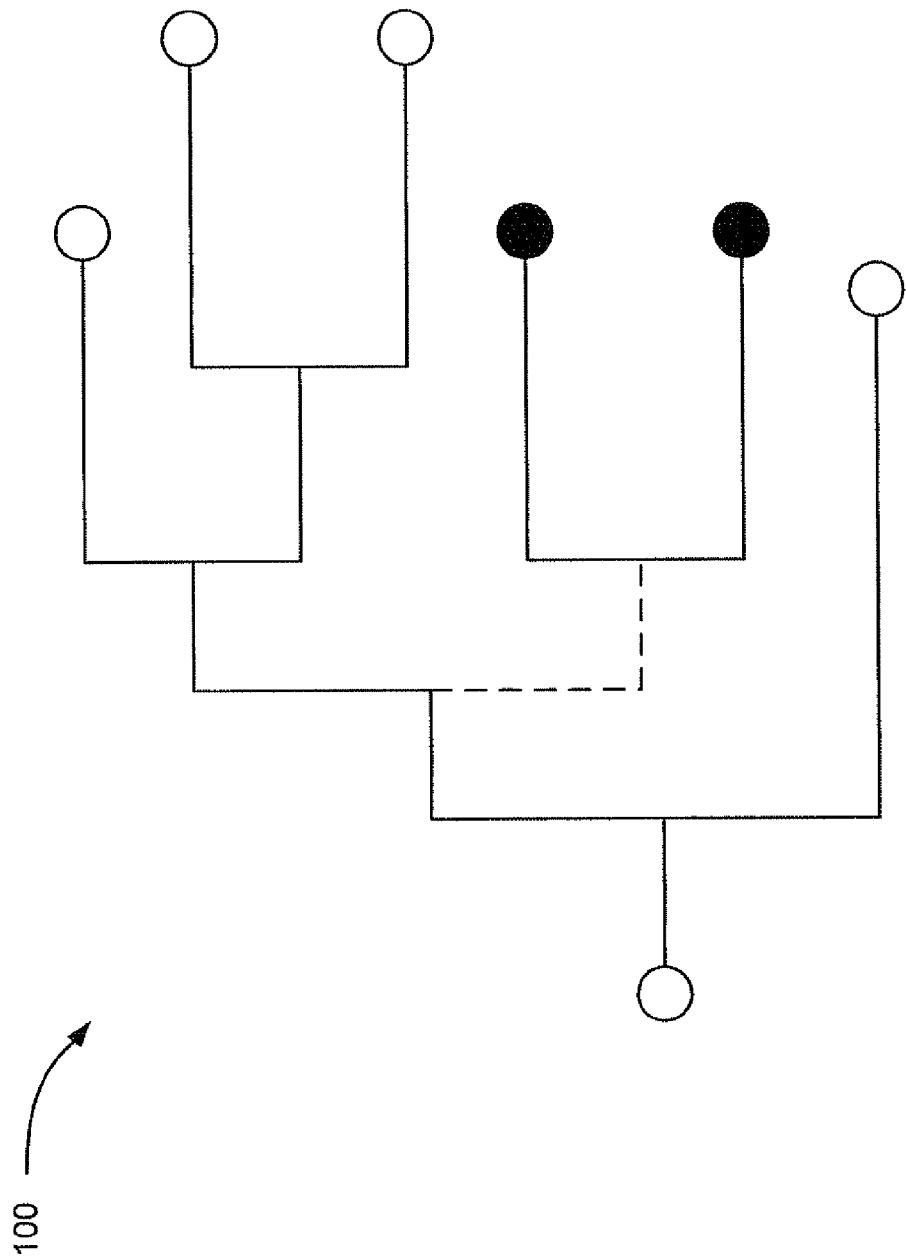
Figure 2J:
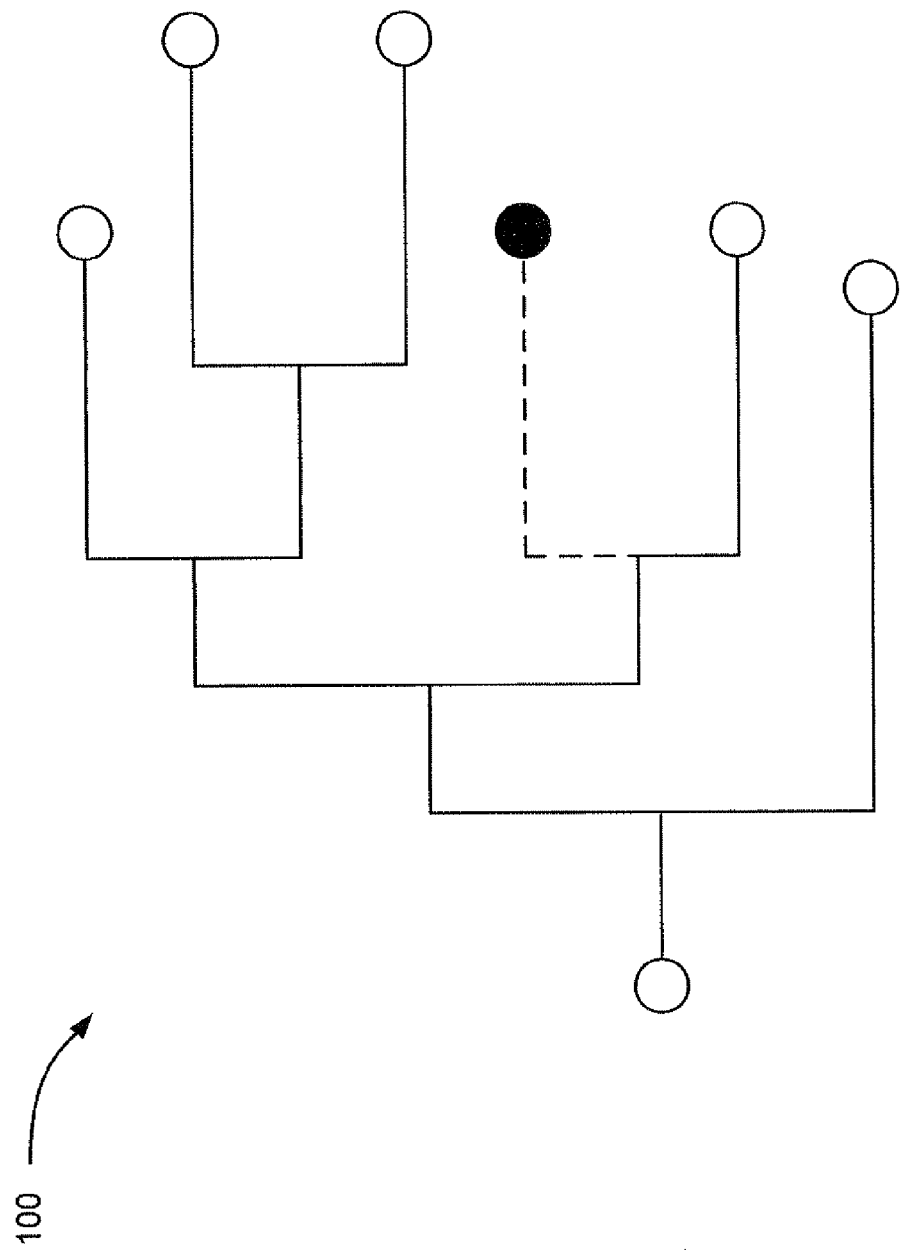

Binary segmentation may refer to and/or may include a removal of at least one branch or edge that connects to at least one node in the additive tree. For example, FIGS. 2A-2K are diagrams illustrating an exemplary binary segmentation of additive tree 100. As illustrated in FIGS. 2A-2K, additive tree 100 comprises eleven branches which may be removed (illustrated as a dashed line) from additive tree 100. For example, FIG. 2A illustrates a first branch being removed, FIG. 2B illustrates a second branch being removed, etc., and FIG. 2K illustrates an eleventh branch being removed from additive tree 100.

Cluster validation may include cluster analysis to confirm whether a clustering of data is valid. Conventional cluster validation techniques often utilize branch division approaches based on their application to ultrametric trees or minimal spanning trees. However, branch division approaches may create invalid cluster divisions (e.g., due to outliers in the data set) when applied to additive trees. An outlier may include a data member associated with a data set that may be numerically distant from other data members.

Figure 3A:
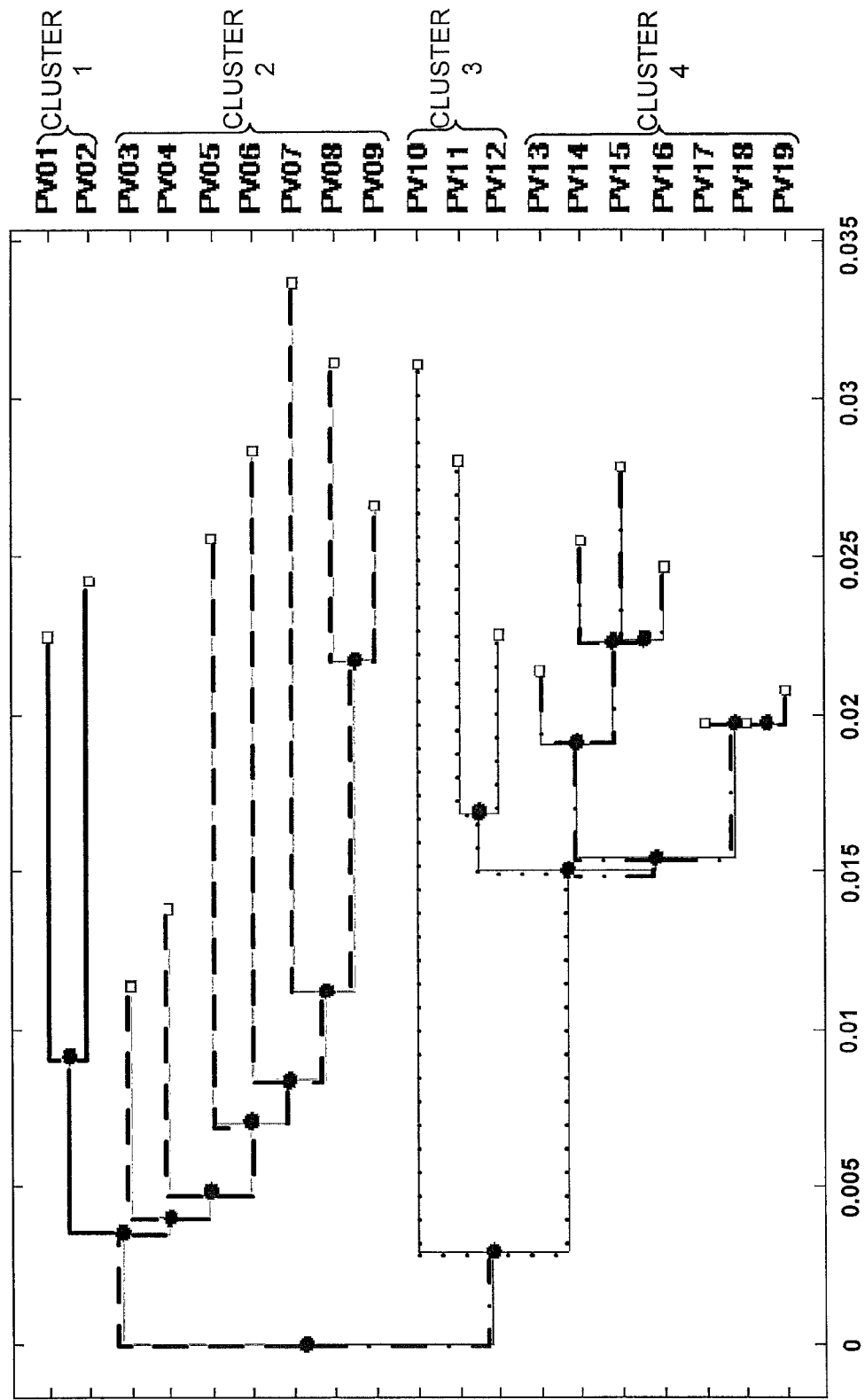
FIGS. 3A and 3B are diagrams illustrating exemplary cases of invalid clusters.

For example, branch division approaches may split a cluster, including an outlier, into two or more clusters before isolating the outlier. FIG. 3A is a diagram illustrating an exemplary case of invalid clusters.

As illustrated in FIG. 3A, assume that a data member PV10 (or alternatively referred to as PV10 node) is an outlier. Under a branch division approach, the data set may be clustered, for example, into four clusters—a first cluster including PV01 and PV02 nodes, a second cluster including PV03-PV09 nodes, a third cluster including PV10-PV12 nodes, and a fourth cluster including PV13-PV19 nodes. In this example, the presence of the outlier data member PV10, which branches from an inner branch of the additive tree, has caused an otherwise compact cluster including PV11-PV19 nodes, to be split into the third cluster and the fourth cluster.

In addition to outliers in a data set, cluster validation is confronted with other complex cases, such as cluster imbalance. Cluster imbalance may refer to a data set representing two or more clusters, where a size of the clusters (i.e., a number of data members in one or more clusters) may be significantly different. Cluster imbalance may also refer to when an expected distance measured from any two data members in a same cluster is significantly different from an expected distance measured from any two data members in another cluster. In view of cluster imbalances that may exist within a data set, however, branch division approaches may split large clusters into two or more smaller clusters. As a result, branch division approaches may incorrectly divide clusters and fail to isolate small clusters and large clusters that may exist in the data set.

Figure 3B:
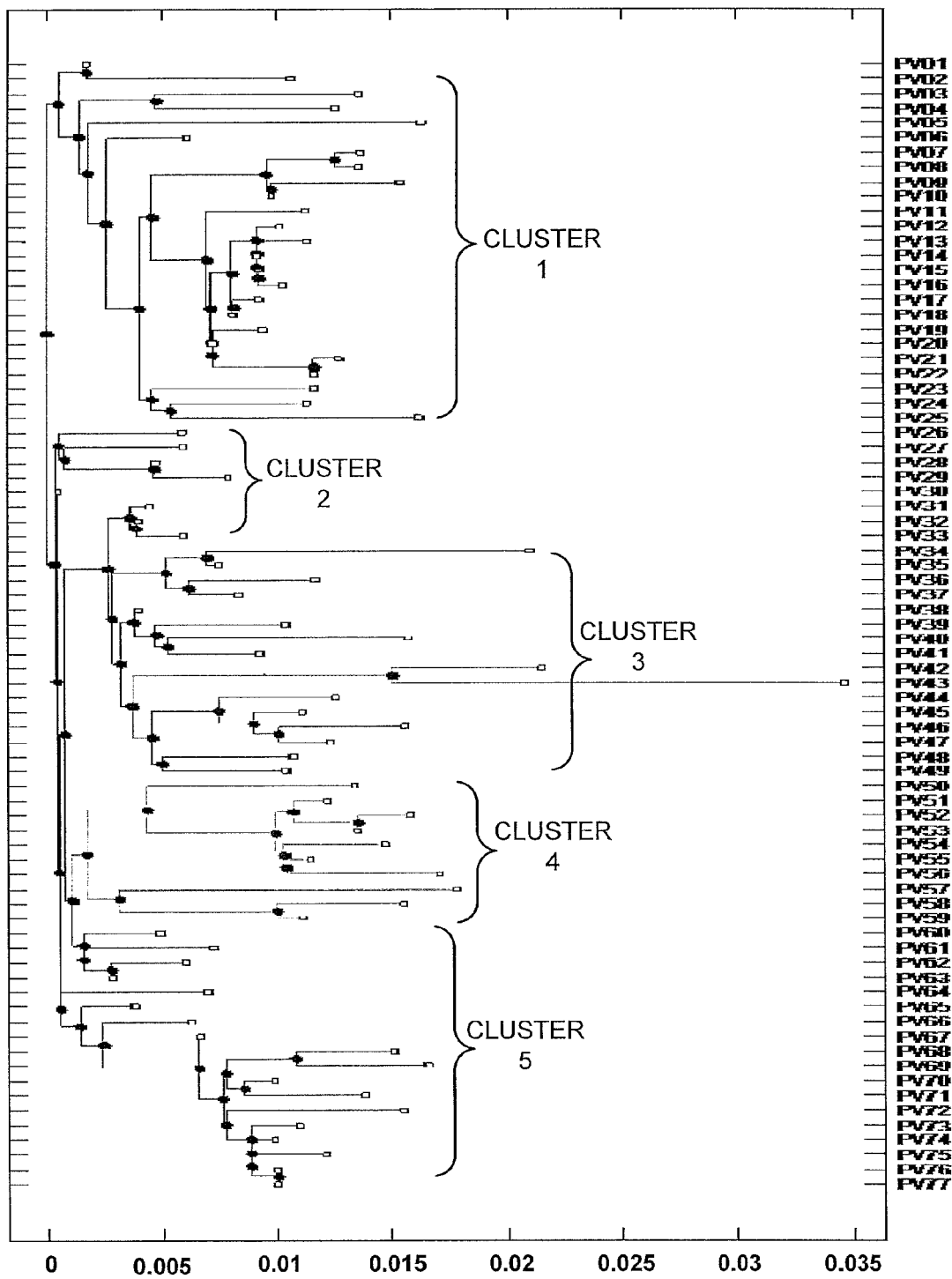

FIG. 3B is a diagram illustrating another exemplary case of invalid clusters. As illustrated, FIG. 3B includes a data set including seventy-seven data members (PV01-PV77). In this example, assume that a valid cluster imbalance exists in the data set. However, under a branch division approach, the data set may be incorrectly clustered. For example, a first cluster may include PV01-PV25 nodes (i.e., twenty-five data members), a second cluster may include PV26-PV33 nodes (i.e., eight data members), a third cluster may include PV34-PV49 nodes (i.e., sixteen data members), a fourth cluster may include PV50-PV59 nodes (i.e., ten data members), and a fifth cluster may include PV60-PV77 nodes (i.e., eighteen data members). In this case, the data set may be clustered such that an invalid cluster balance is represented.

Figure 4A:
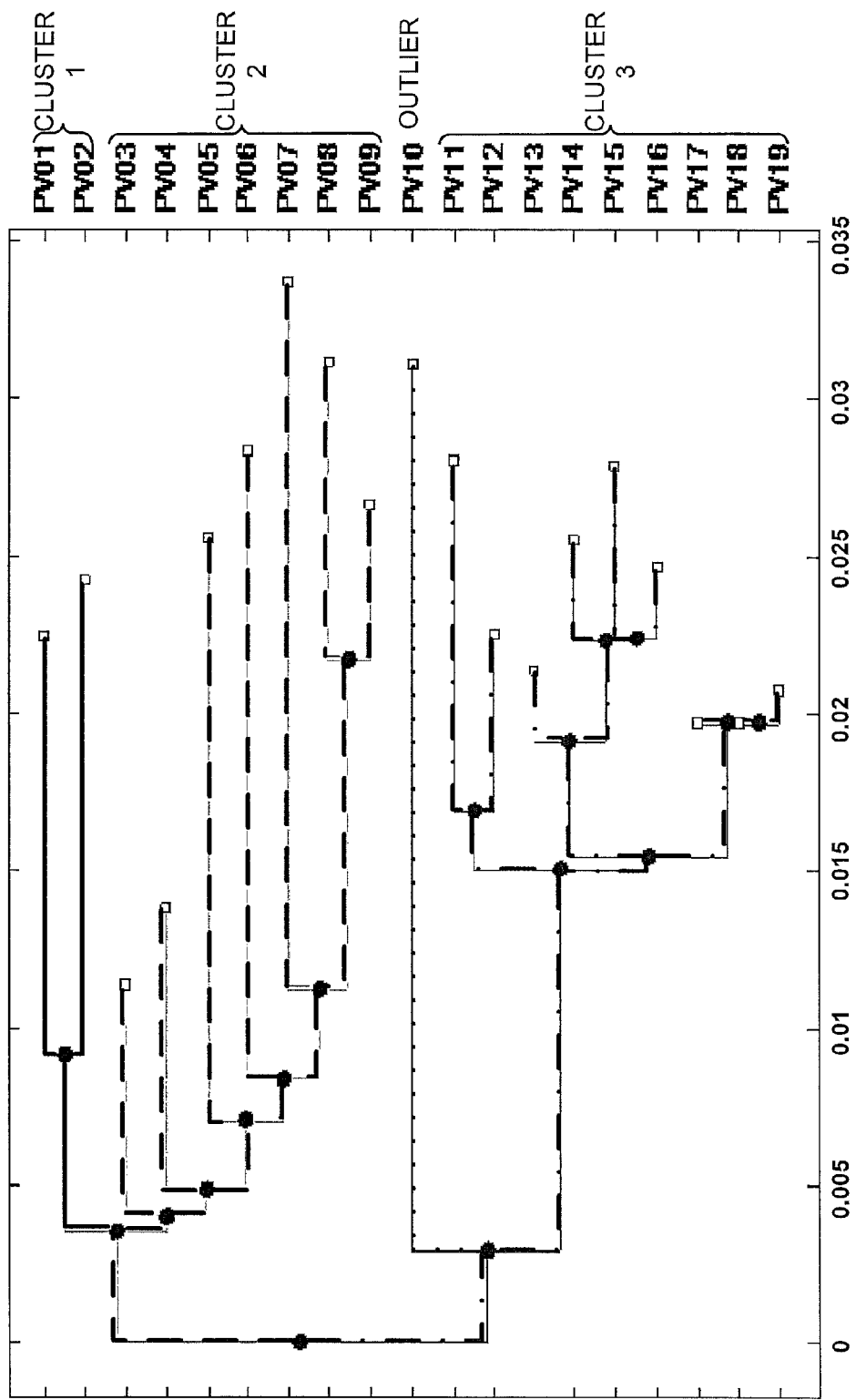
FIGS. 4A and 4B are diagrams illustrating exemplary cases of valid clusters.

Implementations described herein may include devices, systems, and/or methods that provide cluster validation for an additive tree. In the implementations described, cluster validation may permit, for example, outliers to be identified and/or cluster imbalances to be preserved when outliers and/or cluster imbalances exist in a data set. For example, FIG. 4A is a diagram illustrating an exemplary case of valid clusters. As illustrated, FIG. 4A includes the same data set as previously illustrated and described with respect to FIG. 3A. While four clusters exist, as is the case with respect to FIG. 3A, the outlier PV10 did not cause the otherwise compact cluster including PV11-PV19 nodes to be split. Rather, as illustrated in FIG. 4A, the outlier PV10 node is isolated and constitutes a cluster having a single data member.

Figure 4B:
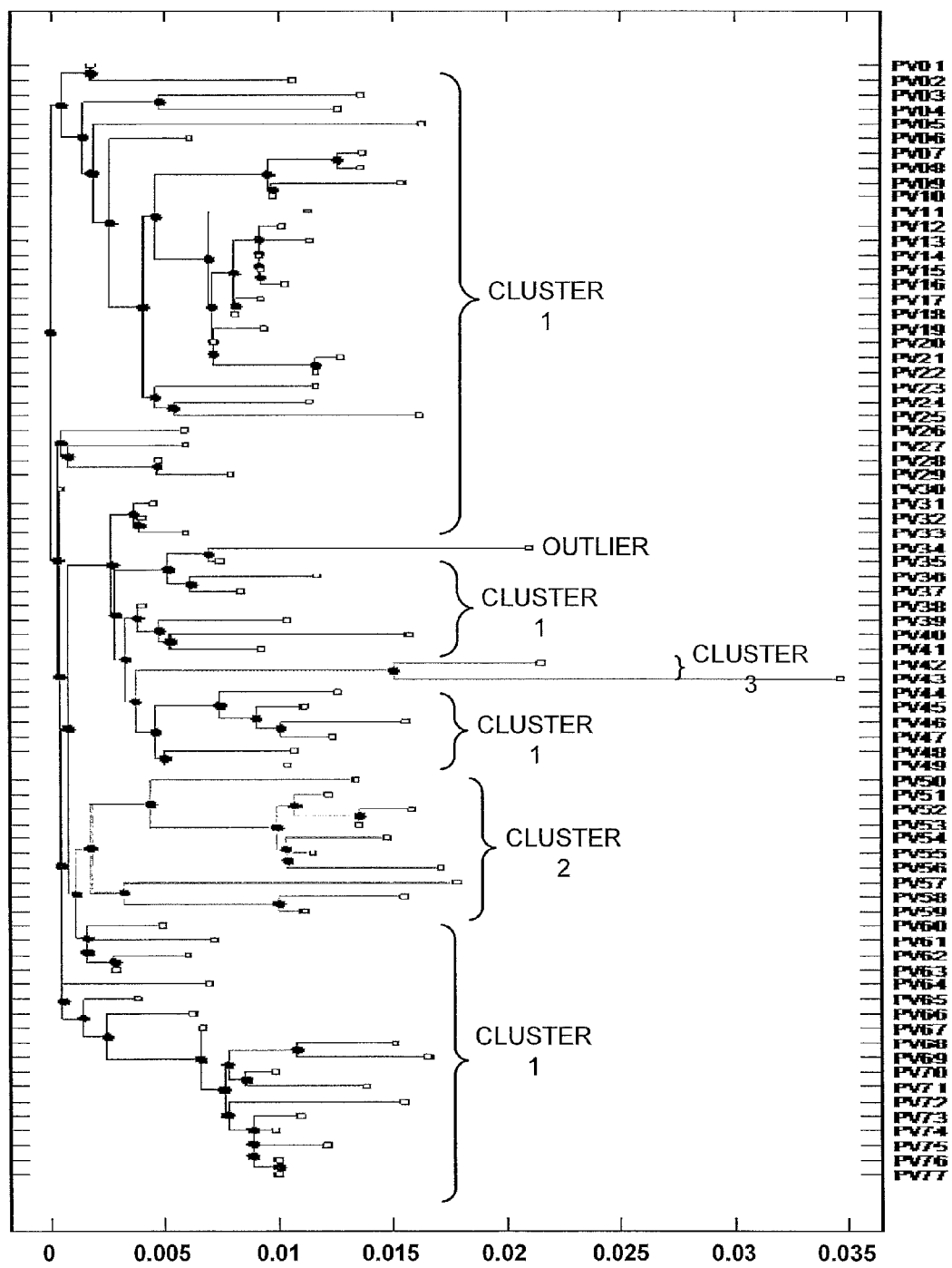

FIG. 4B is a diagram illustrating another exemplary case of valid clusters. As illustrated, FIG. 4B includes the same data set as previously illustrated and described with respect to FIG. 3B. In contrast to FIG. 3B, the data set may be clustered into three clusters and one outlier. For example, a first cluster may include PV01-PV33 nodes, PV34-PV41 nodes, PV44-PV49 nodes, and PV60-PV77 nodes (i.e., sixty-five data members), a second cluster may include PV50-PV59 nodes (i.e., ten data members), and a third cluster may include PV42 and PV43 nodes (i.e., two data members). PV34 node may correspond to the outlier. Thus, in contrast to the clustering associated with FIG. 3B, a cluster imbalance that may exist in the data set is preserved.

FIG. 5 illustrates an exemplary environment 500 that provides cluster validation according to an exemplary implementation described herein. As illustrated, environment 500 may include a user device 505 that includes clustering logic 510.

User device 505 may include a computational device. For example, user device 505 may include a server, a workstation, a mainframe, a computer (e.g., a desktop computer, a laptop computer, etc.), a terminal, and/or some other type of computational device.

Clustering logic 510 may include hardware-based logic and/or a combination of hardware and software-based logic that provides a computing environment. The computing environment may provide for cluster validation of an additive tree. The process in which clustering logic 510 provides for cluster validation of an additive tree will be described in greater detail below.

Clustering logic 510 may include a user interface (e.g., a graphical user interface (GUI)) that allows a user to govern settings associated with performing cluster validation, display cluster validation results, analyze clusters, etc. The user interface may be interactive and allow the user to select settings associated with cluster validation before and/or during an iteration of cluster validation. For example, the user may select settings, such as, one or more cluster validation criteria and/or one or more exit criteria, as described in greater detail below. Additionally, or alternatively, the user may indicate a data member of a data set as an outlier (e.g., during an iteration of cluster validation) and/or modify criteria, for example, during an iteration of cluster validation.

Although FIG. 5 illustrates an exemplary environment 500, in other implementations, environment 500 may include additional and/or different components.

Exemplary User Device Configuration

Figure 6:
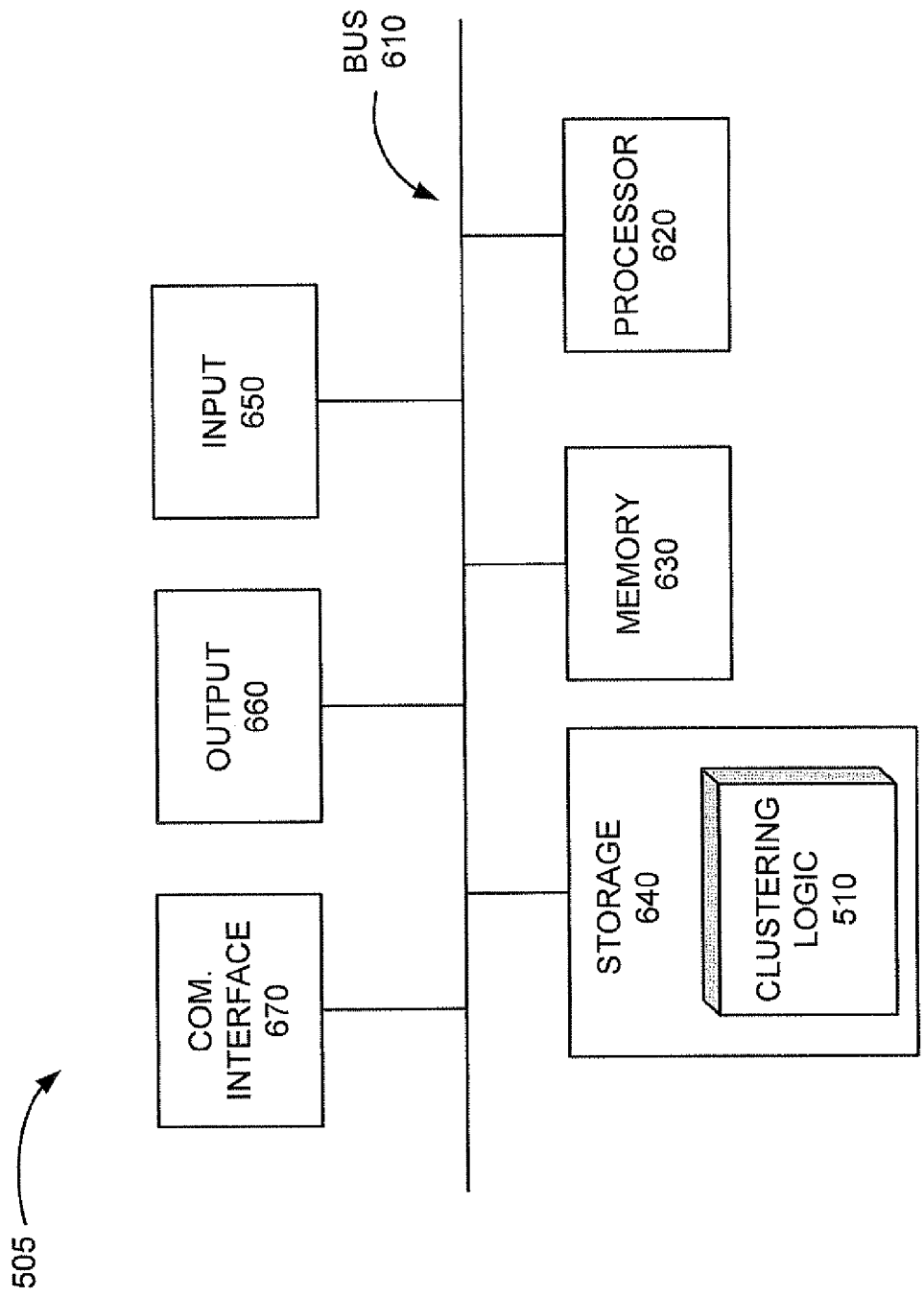
FIG. 6 is a diagram illustrating exemplary components of the user device depicted in FIG. 5.

FIG. 6 is a diagram illustrating exemplary components of user device 505. As illustrated, user device 505 may include a bus 610, a processor 620, a memory 630, storage 640, an input 650, an output 660, and a communication interface 670.

Bus 610 may permit communication among the other components of user device 505. For example, bus 610 may include a system bus, an address bus, a data bus, and/or a control bus. Bus 610 may also include bus drivers, bus arbiters, bus interfaces, and/or clocks.

Processor 620 may interpret and/or execute instructions. For example, processor 620 may include one or more general-purpose processors, microprocessors, data processors, graphical processing units (GPUs), co-processors, network processors, application specific integrated circuits (ASICs), application specific instruction-set processors (ASIPs), system-on-chip (SOCs), controllers, programmable logic devices (PLDs), chipsets, and/or field programmable gate arrays (FPGAs).

Memory 630 may store data and/or instructions related to the operation and use of user device 505. For example, memory 630 may store data and/or instructions that may be configured to implement one or more operations. Memory 630 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 640 may store data and/or software related to the operation and use of user device 505. For example, storage 640 may include a hard disk (e.g., a magnetic disk, an optical disk, a magneto-optic disk, a solid state disk), a compact disc (CD), a digital versatile disc (DVD), a floppy disk, a cartridge, a magnetic tape, and/or another type of computer-readable medium, along with a corresponding drive. Computer-readable medium may include a memory, storage, or the like. The computer-readable medium may be tangible and may be implemented in a single device, in multiple devices, in a centralized manner, or in a distributed manner. The computer-readable medium may correspond to, for example, a physical memory device or a logical memory device that can store executable instructions for performing one or more activities and/or that can store data. A logical memory device may include memory space within a single physical memory device or memory space spread across multiple physical memory devices. The computer-readable medium may store data and/or instructions configured to implement one or more operations.

Memory 630 and/or storage 640 may also include a storing device external to and/or removable from user device 505, such as a Universal Serial Bus (USB) memory stick, a hard disk, etc. As previously described, clustering logic 510 may include hardware-based logic and/or a combination of hardware and software-based logic. In an implementation, as illustrated in FIG. 6, storage 640 may store software-based logic associated with clustering logic 510. In an implementation, hardware-based logic associated with clustering logic 510 may be implemented by processor 620.

Input 650 may permit a user and/or another device to input information into user device 505. For example, input 650 may include a keyboard, a keypad, a mouse, a display (e.g., a touch screen), a button, a switch, a microphone, voice recognition logic, an input port, and/or some other type of input component. Output 660 may permit user device 505 to output information to the user and/or another device. For example, output 660 may include a display, a speaker, one or more light emitting diodes (LEDs), an output port, and/or some other type of output component.

Communication interface 670 may permit user device 505 to communicate with other devices, networks, and/or systems. Communication interface 670 may include a transceiver-like component. For example, communication interface 670 may include an Ethernet interface, an optical interface, a coaxial interface, a radio interface, and/or some other type of wireless and/or wired interface.

As will be described in detail below, user device 505 may perform certain operations that provide for cluster validation of an additive tree. User device 505 may perform these operations in response to processor 620 executing software instructions contained in a computer-readable medium, such as memory 630 and/or storage 640. The software instructions may be read into memory 630 from another computer-readable medium or from another device via communication interface 670. The software instructions contained in memory 630 and/or storage 640 may cause processor 620 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 6 illustrates exemplary components of user device 505, in other implementations, user device 505 may include fewer, additional, and/or different components, and/or a different arrangement of components than those depicted in FIG. 6 and described. In still other implementations, one or more components of user device 505 may perform one or more other processes described as being performed by one or more other components of user device 505.

Figure 7A:
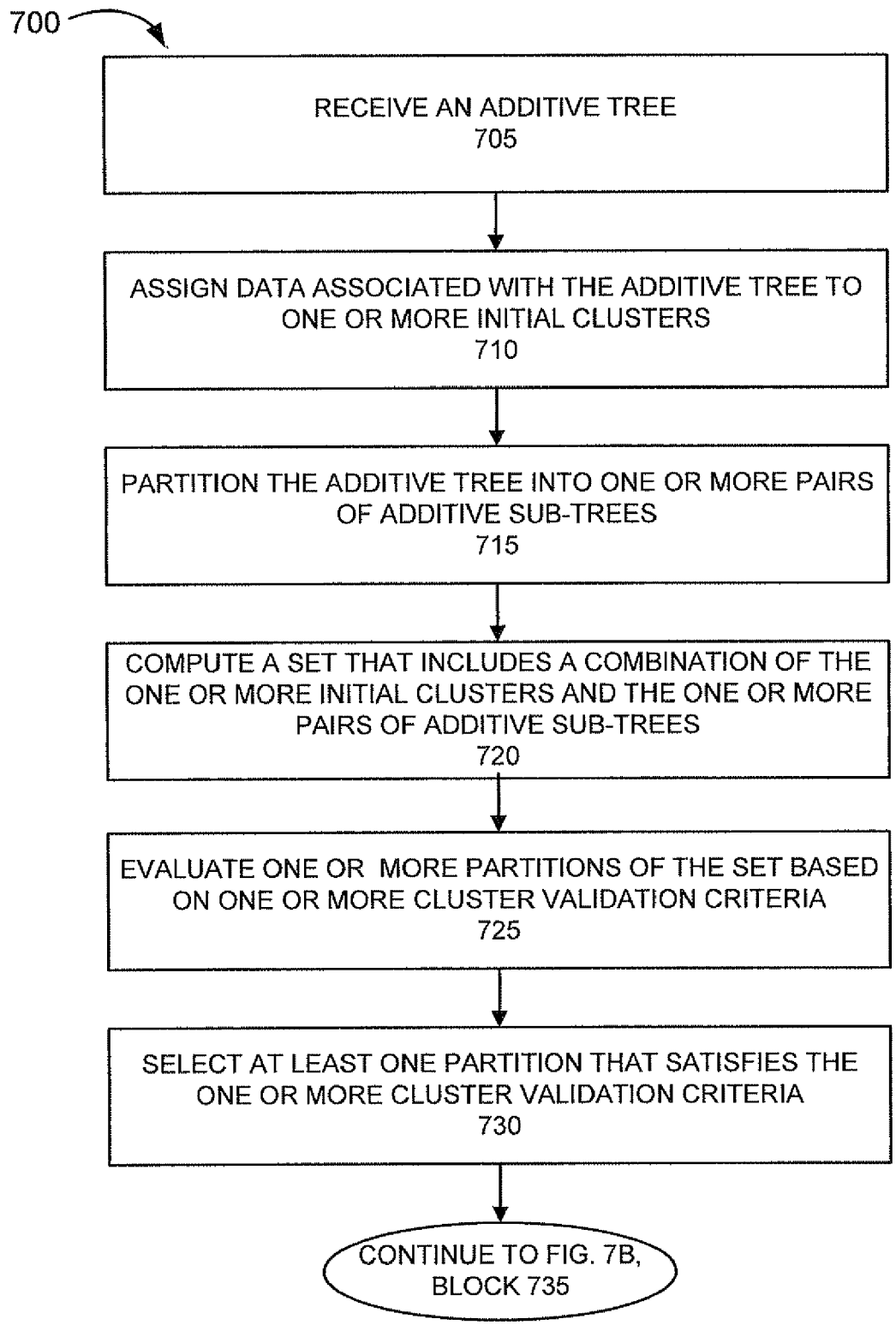
FIGS. 7A and 7B are flow diagrams illustrating an exemplary process associated with an implementation for providing cluster validation.
Figure 7B:
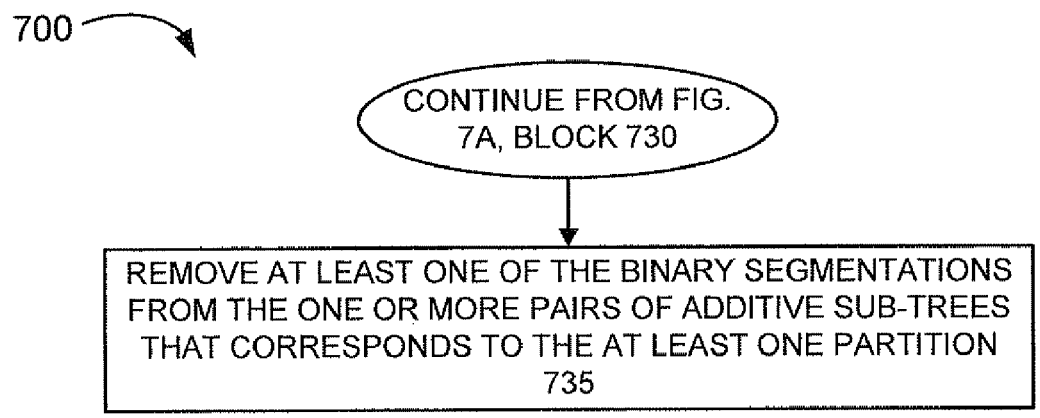

FIGS. 7A and 7B are flow diagrams illustrating an exemplary process 700 associated with an implementation for providing cluster validation. In an implementation, user device 505 (e.g., clustering logic 510) may perform process 700. In other implementations, process 700 may be performed by a group of devices, including or excluding user device 505. For example, process 700 may be performed in a distributed environment, which is described in greater detail below.

Referring to FIG. 7A, process 700 may include receiving an additive tree (block 705). For example, clustering logic 510 may receive an additive tree. The additive tree may represent various types of data, such as, for example, biological samples, proximity data, behavioral science data, numerical sequences, or any other type of data set where there may be similarity or dissimilarity between data members within the data set.

Data associated with the additive tree may be assigned to one or more initial clusters (block 710). For example, clustering logic 510 may initialize the data associated with additive tree 100 into one or more clusters. In an implementation, a user may designate one or more criteria to initialize the data associated with the additive tree into one or more clusters. In another implementation, clustering logic 510 may automatically initialize the data into one or more clusters. For example, clustering logic 510 may automatically initialize the data into a single cluster. Alternatively, for example, clustering logic 510 may automatically initialize the data into multiple clusters. For example, clustering logic 510 may cluster the data based on default criteria based on the type of data associated with the additive tree.

The additive tree may be partitioned into one or more pairs of additive sub-trees (block 715). For example, clustering logic 510 may partition the additive tree into one or more pairs of additive sub-trees. By way of example, referring back to FIGS. 2A-2K, clustering logic 510 may identify all (or fewer) binary segmentations of the additive tree and partition the additive tree into one or more pairs of additive sub-trees.

Figure 8A:
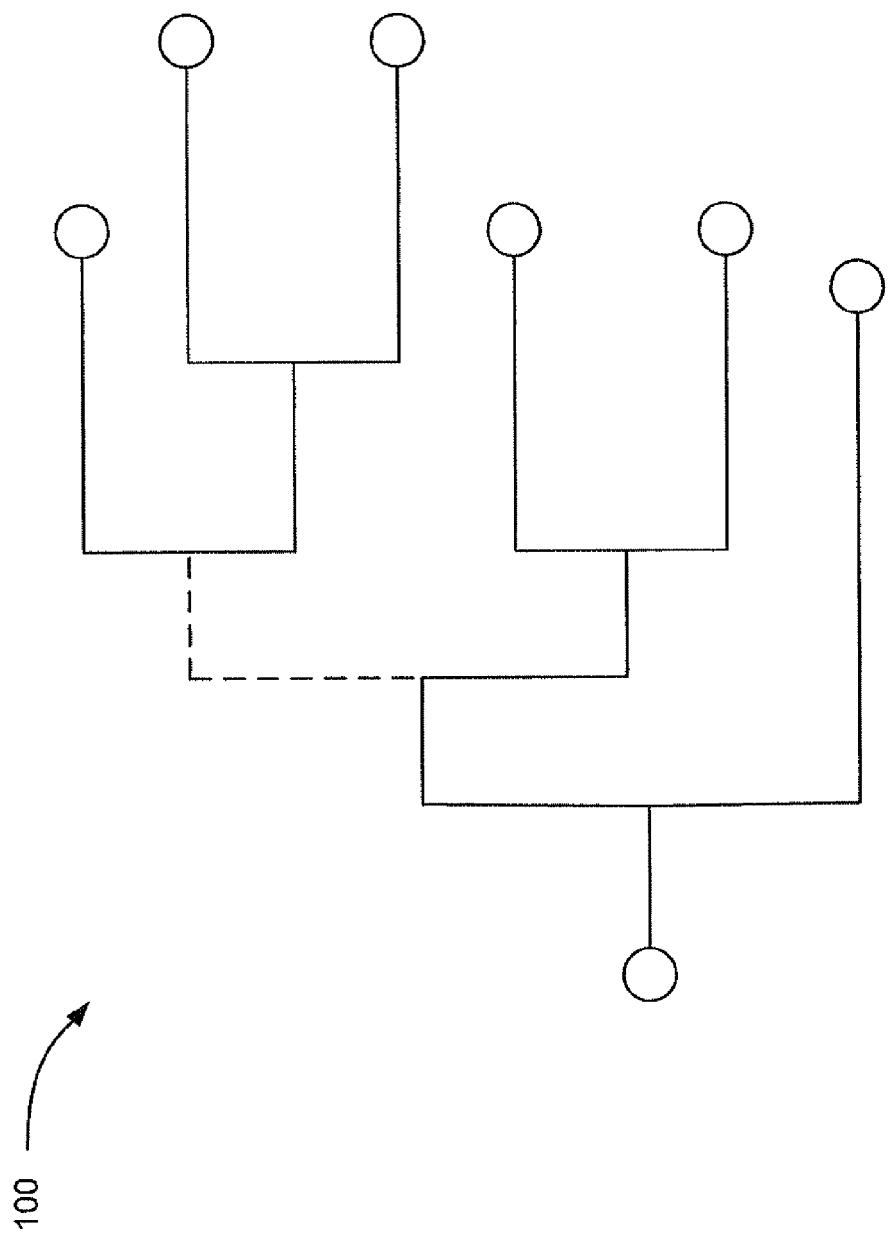
FIGS. 8A-8C are diagrams illustrating exemplary processes associated with an iteration of cluster validation as applied to an exemplary additive tree.
Figure 8B:
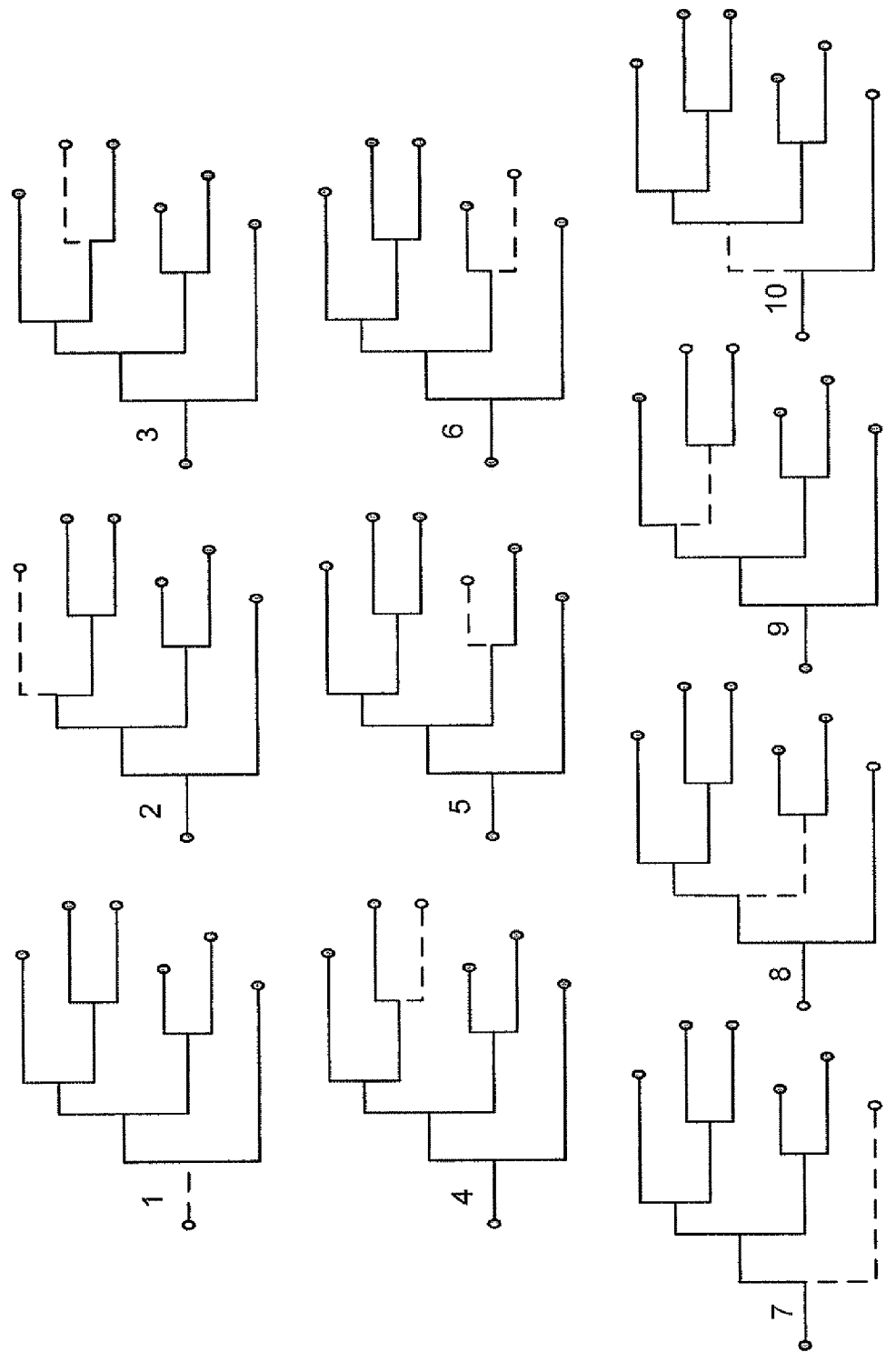
Figure 8C:
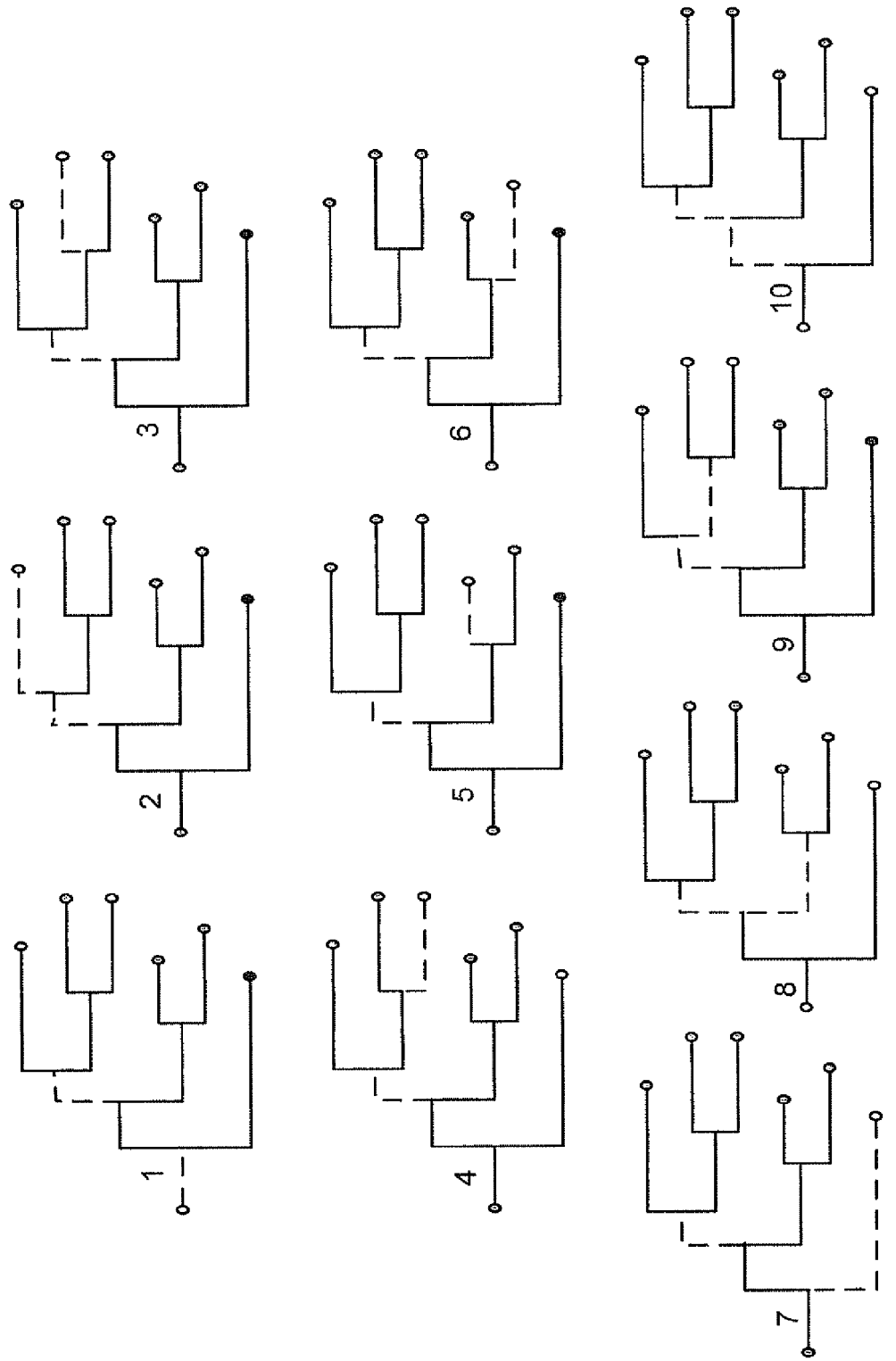

A set that may include a combination of the one or more initial clusters and the one or more pairs of additive sub-trees may be computed (block 720). For example, clustering logic 510 may compute a set which includes a combination of the one or more initial clusters and the one or more pairs of additive sub-trees. By way of example, FIGS. 8A-8C are diagrams that illustrate this concept. FIG. 8A illustrates additive tree 100 that has a binary segmentation already removed (illustrated by a dashed line). For example, the binary segmentation may have been removed based on a previous iteration of cluster validation. For sake of example, assume that additive tree 100, as illustrated in FIG. 8A, corresponds to the one or more initial clusters. FIG. 8B illustrates all possible partitions (i.e., binary segmentations) of additive tree 100. In this example, there are 10 possible partitions of additive tree 100. For sake of example, assume that these partitions correspond to the one or more pairs of additive sub-trees.

FIG. 8C illustrates an exemplary computed set which includes a combination of the one or more initial clusters (as illustrated in FIG. 8A) and the one or more pairs of additive sub-trees (as illustrated in FIG. 8B). In particular, for example, the branch removed from additive tree 100, as illustrated in FIG. 8A, when combined with the first (no. 1) partition of additive tree 100, as illustrated in FIG. 8B, may yield the first (no. 1) partition of additive tree 100, as illustrated in FIG. 8C. Similarly, the branch removed from additive tree 100, as illustrated in FIG. 8A, when combined with the second (no. 2) partition of additive tree 100, as illustrated in FIG. 8B, may yield the second (no. 2) partition of additive tree 100, as illustrated in FIG. 8C. While FIG. 8C illustrates a set including all combinations, clustering logic 510 may or may not compute a set that includes all combinations of the one or more pairs of additive sub-trees and the one or more initial clusters.

One or more partitions of the set may be evaluated based on one or more cluster validation criteria (block 725). For example, clustering logic 510 may evaluate one or more partitions of the set based on one or more cluster validation criteria. For example, clustering logic 510 may receive a user selection of one or more cluster validation criteria. For example, the one or more cluster validation criteria may include a maximum within a cluster pairwise distance, a median within a cluster pairwise distance, an average within a cluster pairwise distance, a metric based on a ratio of a between cluster pairwise distance average and a within cluster pairwise distance average, and/or an average silhouette width. Additionally, or alternatively, other types of cluster validation criteria may be utilized that evaluate a compactness or separateness of a given cluster. Depending on the cluster validation criterion utilized, clustering logic 510 may identify a maximum value or a minimum value associated with a particular partition. However, in instances when the cluster validation criterion does not yield, for example, a scalar value, clustering logic 510 may rely on pre-defined rules or user-specified rules to evaluate the one or more partitions.

Additionally, when a previous iteration of process 700 has occurred, a cluster validation criterion may include a metric based on a ratio. For example, in an implementation, a numerator of the ratio may correspond to one of the maximum within a cluster pairwise distance, the median within a cluster pairwise distance, the average within a cluster pairwise, the metric based on a ratio of a between cluster pairwise distance average and a within pairwise distance average, or the average silhouette width, and a denominator of the ratio may include an average within a cluster pairwise distance.

In the context of phylogentic trees that may be built from sequence data (e.g., DNA, RNA, or aminoacids) a distance may be calculated based on an evolutionary model or by an alignment score resulting after combining individual sequences or profiles of sequences with a dynamic programming algorithm (e.g., the Needleman-Wunsch algorithm for global alignment, or the Smith-Waterman algorithm for local alignment). Clustering logic 510 may store its evaluation results.

At least one partition that satisfies the one or more cluster validation criteria may be selected (block 730). For example, clustering logic 510 may identify and select at least one partition that satisfies the one or more cluster validation criteria. In an implementation, clustering logic 510 may select the partition that best satisfies the one or more validation criteria. For example, depending on the one or more validation criteria, this may correspond to a largest value, a smallest value, or some other quantifiable value, which, relative to other partitions, may be considered an optimal value or best satisfies the one or more validation criteria. In another implementation, clustering logic 510 may select the at least one partition that simply satisfies the one or more validation criteria. In cases when clustering logic 510 selects the partition that satisfies the one or more validation criteria and there is a tie between two or more partitions, in an implementation, clustering logic 510 may apply one or more additional validation criteria to the two or more partitions in order to break the tie. For example, clustering logic 510 may prompt the user to select one or more validation criteria.

Referring to FIG. 7B, at least one of the binary segmentations from the one or more pairs of additive sub-trees that correspond to the at least one partition may be removed (block 735). For example, clustering logic 510 may remove at least one of the binary segmentations that correspond to the at least one partition.

It will be appreciated that process 700 (or one or more blocks of process 700) may be repeated. For example, in an implementation, process 700 may repeat blocks 715 through 735. In an implementation, the repeating may be performed until one or more exit criteria are met. For example, the one or more exit criteria may include a user-defined number of repeating, until no further repeating can be performed, and/or a threshold value that may be dependent on the one or more cluster validation criteria. Additionally, or alternatively, process 700 may repeat until all possible iterations (i.e., until each cluster contains one node each) have been performed. Clustering logic 510 may then review, for each iteration, the one or more validation criteria, and select a global validation criterion to provide cluster validation of the data set.

Figure 9A:
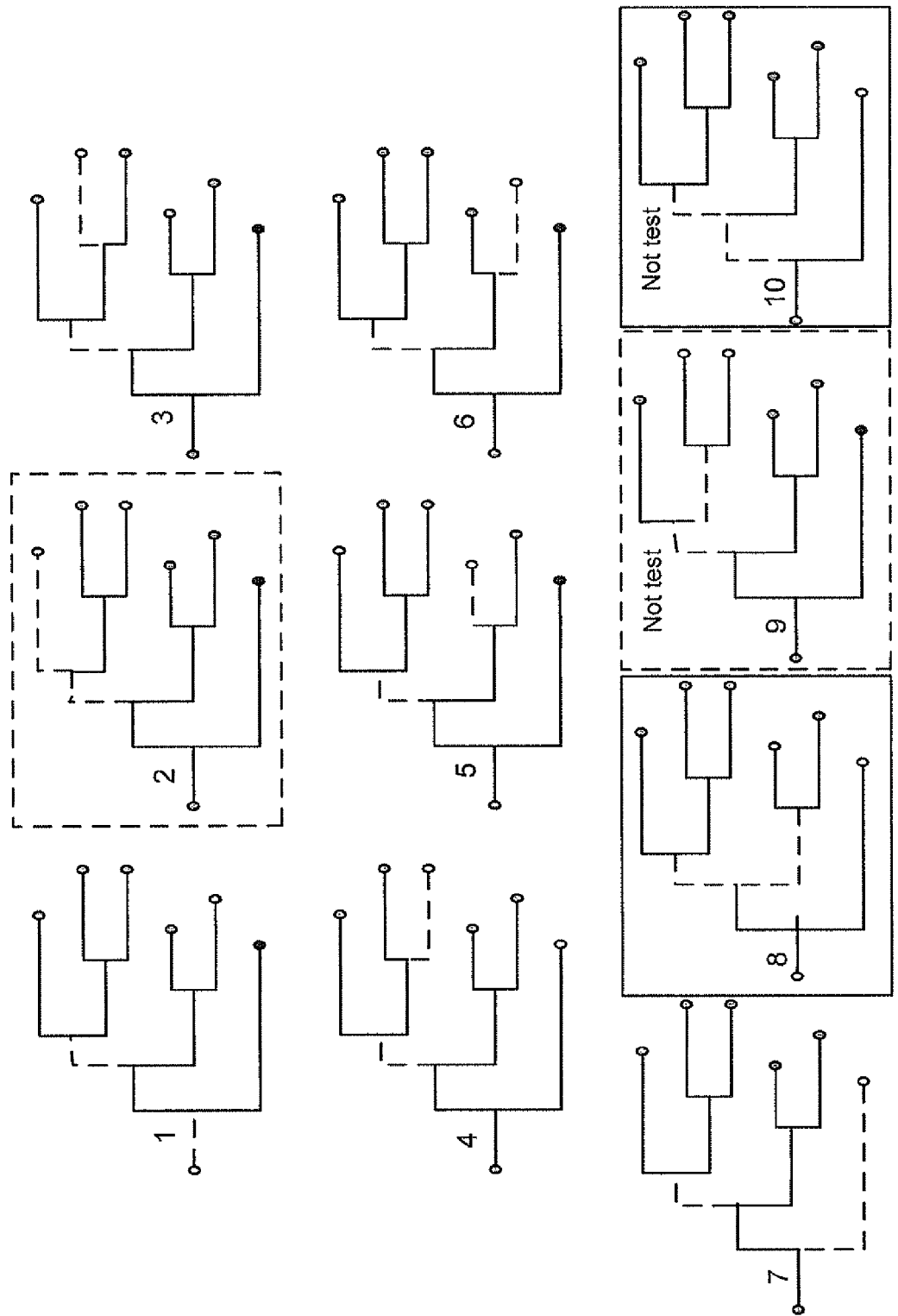
FIGS. 9A and 9B are diagrams illustrating exemplary processes associated with an iteration of cluster validation as applied to an exemplary additive tree.
Figure 9B:
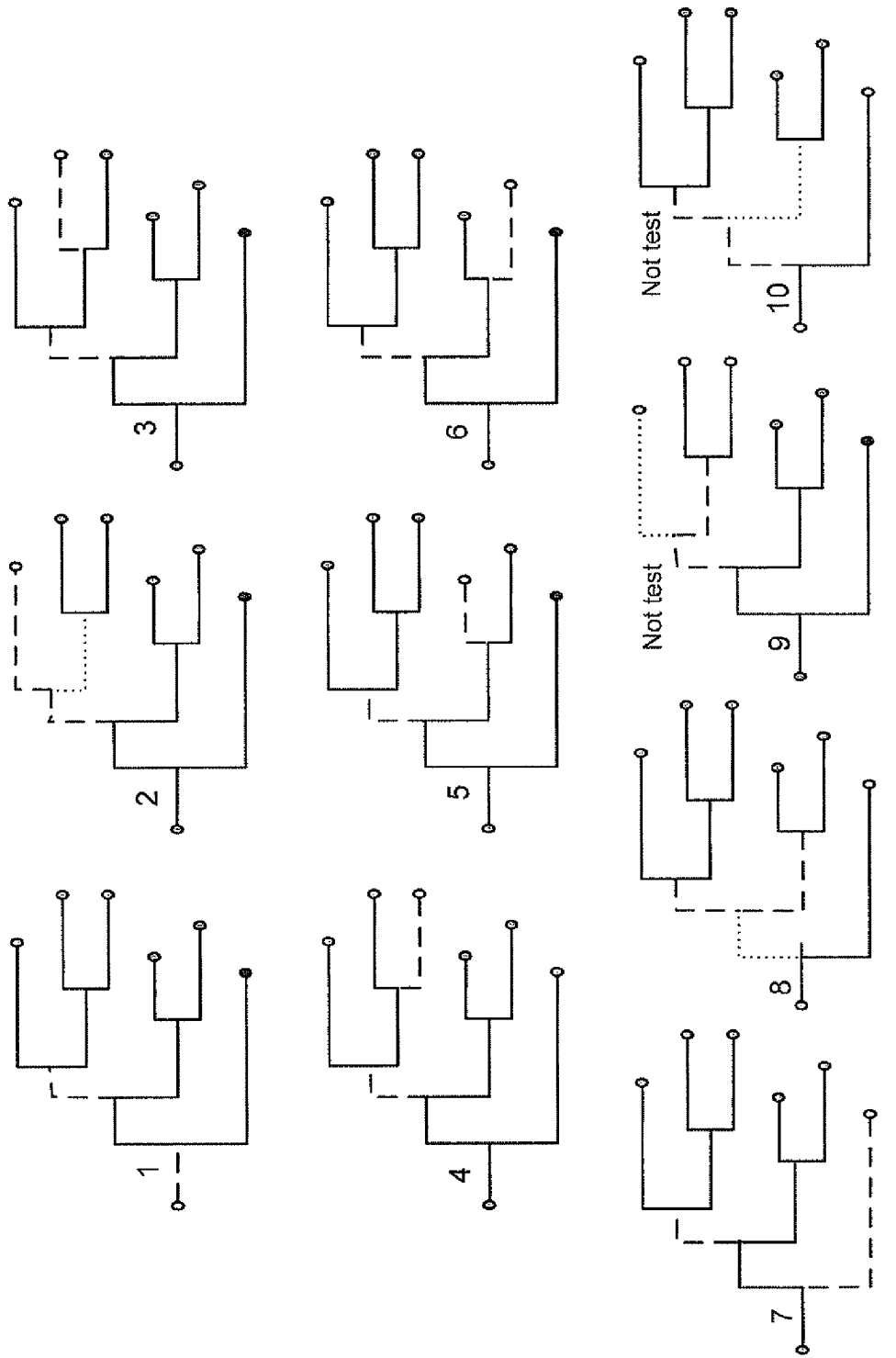

Additionally, or alternatively, process 700 may include other acts. For example, when clustering logic 510 computes a set that includes a combination of the one or more pairs of additive sub-trees and the one or more initial clusters, there may be instances when two or more combinations yield essentially the same cluster. FIG. 9A is a diagram illustrating this concept. For example, clustering logic 510 may identify that combination no. 2 and combination no. 9 are essentially the same and that combination no. 8 and combination no. 10 are essentially the same. In an implementation, clustering logic 510 may select one combination from each pair (e.g., combination no. 2 and combination no. 8) before evaluating the one or more partitions with one or more cluster validation criteria. In such an implementation, clustering logic 510 may not evaluate (i.e., not test) combination no. 9 and combination no. 10, as illustrated in FIG. 9A. Additionally, or alternatively, clustering logic 510 may remove binary segmentations from the one or more additive sub-trees that cannot create a new partition of a node from a subsequent iteration of process 700. For example, referring to FIG. 9B, branches (also known as "edges") illustrated by dotted lines in combination nos. 2, 8, 9, and 10 may be removed since these binary segmentations cannot create a new partition of a node from a subsequent iteration of process 700.

Additionally, or alternatively, as previously described, clustering logic 510 may include a user interface that allows the user to govern settings associated with performing a cluster validation. The user interface may be interactive and allow the user to modify settings during an iteration of cluster validation. For example, the user interface may prompt the user when an error or some other type of triggering event occurs. The user may then be able to modify settings (e.g., select a different cluster validation criterion).

Figure 10:
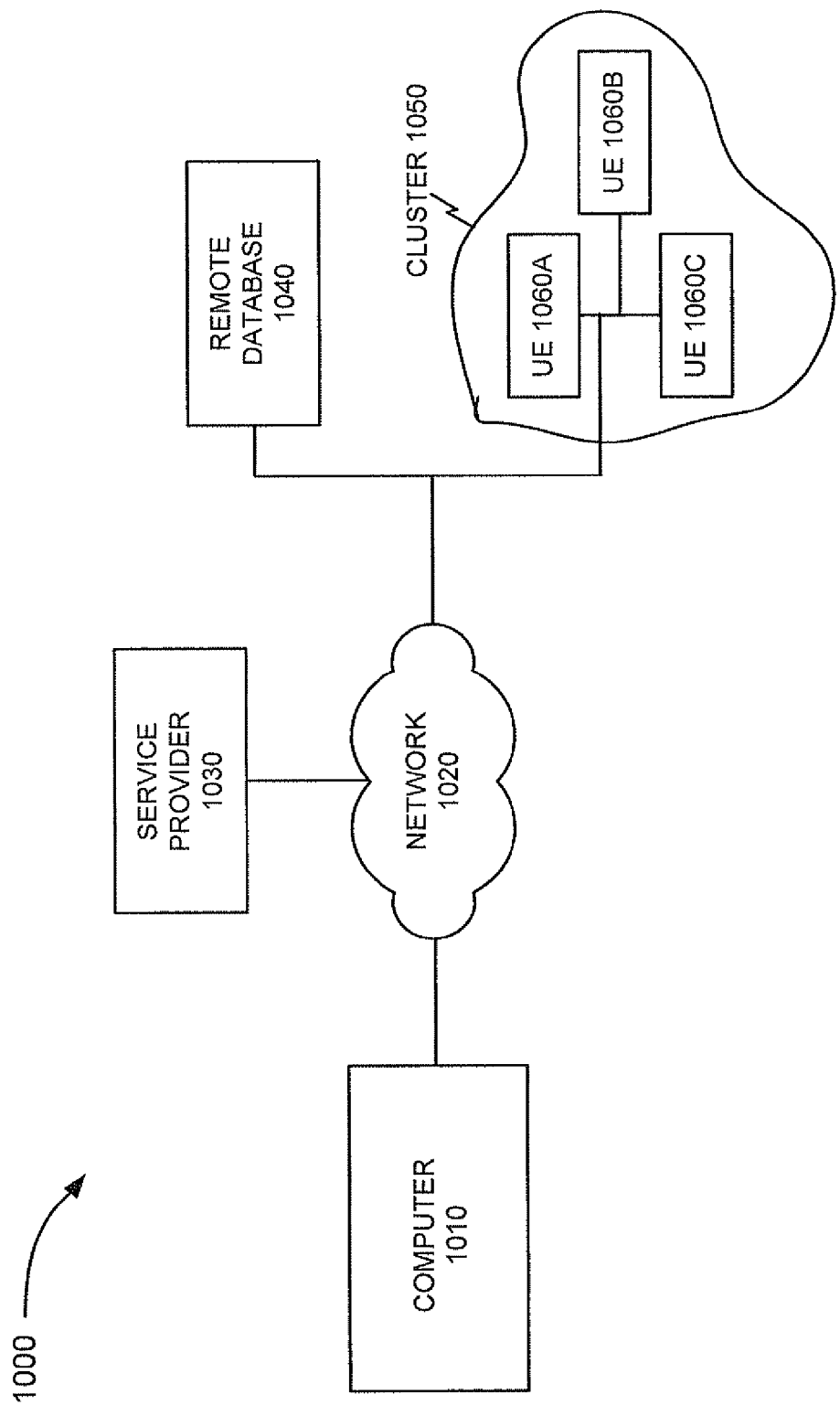
FIG. 10 is a diagram illustrating an exemplary distributed environment.

FIG. 10 illustrates an example of a distributed environment 1000 that may be configured to implement one or more implementations. Referring to FIG. 10, environment 1000 may include a computer 1010, a network 1020, a service provider 1030, a remote database 1040, and a cluster 1050. The implementation of FIG. 10 is exemplary and other distributed implementations may include more devices and/or components, fewer devices and/or components, and/or devices/components in configurations that differ from the exemplary configuration of FIG. 10.

Computer 1010 may include a desktop computer, a laptop computer, or some other type of device. Computer 1010 may include a GUI for allowing a user to interact with computer 1010 and/or remote devices (e.g., service provider 1030). The GUI may allow the user to govern settings associated with performing a cluster validation, display cluster validation results, etc.

Network 1020 may include any network capable of transferring data (e.g., packet data or non-packet data). Implementations of network 1020 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.10, etc.

Network 1020 may include network devices, such as routers, switches, firewalls, and/or servers (not shown). Network 1020 may be a hardwired network using wired conductors and/or optical fibers and/or may be a wireless network using free-space optical, radio frequency (RF), and/or acoustic transmission paths. In an implementation, network 1020 may be a substantially open public network, such as the Internet. In another implementation, network 1020 may be a more restricted network, such as a corporate virtual network. Implementations of networks and/or devices operating on networks described herein are not limited to any particular data type, protocol, architecture/configuration, etc. For example, in an implementation, network 1020 may be a quantum network that uses quantum-compatible networking protocols.

Service provider 1030 may include a device that makes a service available to another device. For example, service provider 1030 may include an entity that provides one or more services to a destination using a server and/or other devices. Services may include instructions that are executed by a destination to perform an operation. Alternatively, a service may include instructions that are executed on behalf of a destination to perform an operation on the destination's behalf.

Assume, for sake of example, that a service provider operates a web server that provides one or more web-based services to a destination, such as computer 1010. The web-based services may allow computer 1010 to perform distributed processing for supporting cluster validation. The web-based services may also allow computer 1010 to view interactive GUIs during a cluster validation. In an implementation, a customer (user) may receive services on a subscription basis.

A subscription may include substantially any type of arrangement, such as monthly subscription, a per-use fee, a fee based on an amount of information exchanged between service provider 1030 and the customer, a fee based on a number of processor cycles used by the customer, a fee based on a number of processors used by the customer, etc.

Remote database 1040 may include a device that stores machine-readable information for use by other devices, such as computer 1010. In an implementation, remote database 1040 may include an array or grid of storage devices (e.g., hard disks, optical disks, solid-state storage devices, etc.) that store clustering logic, cluster validation logic, or the like.

Cluster 1050 may include a group of processing devices, such as units of execution (UE) 1060A, 1060B, and 1060C, which may be used to perform remote processing (e.g., distributed processing, parallel processing, etc.). Units of execution 1060 may include hardware and/or hardware/software based devices that perform processing operations on behalf of a requesting device, such as computer 1010. For example, in an implementation, units of execution 1060A, 1060B, and 1060C may each cluster validate a partial portion of an additive tree, perform binary segmentation, evaluation, etc.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIGS. 7A and 7B, the order of the blocks may be modified in other implementations. Further, non-dependent blocks may be performed in parallel and/or one or more blocks may be omitted. Thus, it will be appreciated that FIGS. 7A and 7B illustrate an exemplary process, and that in other implementations, fewer, additional, or different processes may be performed. It will also be appreciated that depending on environment 500, one or more of these processes described may be performed on one or more devices and/or may involve one or more clustering logic entities. In this regard, process 700 and other acts described elsewhere in this description should not be construed as a process limited to a single user device 505 and/or a single clustering logic 510. Rather, one or more implementations described may be implemented in a distributed environment. For example, distributed implementations may distribute processing across two or more cores in a single processing device, distribute processing across multiple processing devices installed within a single enclosure, and/or distribute processing across multiple types of processing logic connected by a network.

The term "may" is used throughout this description and is intended to be interpreted, for example, as "having the potential to," "configured to," or "being able to", and not in a mandatory sense (e.g., as "must"). The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Implementations described herein may be implemented in many different forms of software, firmware, and hardware. The actual software code or hardware used to implement aspects does not limit the invention. Thus, the operation and behavior of the implementations described herein were described without reference to specific software code—it being understood that software and hardware can be designed to implement the implementations based on the description herein.

In the disclosure herein, logic or component may be implemented by hardware (e.g., processor 620) or a combination of hardware and software. In an implementation, clustering logic 510 may be implemented based on computing and/or modeling applications, such as, but not limited to, MATLAB® by The MathWorks, Inc.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the terms "comprises" or "comprising" when used in the specification is taken to specify the presence of stated features, integers, steps, or components, but does not preclude the presence or addition of one or more other features, integers, steps, components, or groups thereof.

No element, act, or instruction used in the present application should be construed as critical or essential to the implementations described herein unless explicitly described as such.

What is claimed is:

1. One or more computer-readable storage media for storing computer-executable instructions executable by processing logic, the computer-readable media storing one or more instructions for:
   receiving an additive tree;
   assigning data associated with the additive tree to one or more initial clusters;

partitioning the additive tree into one or more pairs of additive sub-trees, where the one or more pairs of additive sub-trees correspond to one or more binary segmentations of the additive tree, where binary segmentation corresponds to a separation of data associated with the additive tree into two disjoint sets;

computing a set that includes partitions resulting from a combination of the one or more initial clusters and the one or more pairs of additive sub-trees;

evaluating one or more partitions of the set with one or more cluster validation criteria, where the one or more cluster validation criteria correspond to one or more metrics that evaluate one or more similarities between data associated with the one or more partitions of the set;

storing one or more evaluation results for the one or more partitions;

selecting at least one partition from the one or more partitions of the set that satisfies the one or more cluster validation criteria, where the at least one partition is associated with an optimal evaluation result relative to the other one or more evaluation results; and removing at least one of the binary segmentations from the one or more pairs of additive sub-trees that corresponds to the at least one partition.

2. The computer-readable media of claim 1, storing one or more instructions for:
repeating the partitioning, the computing, the evaluating, the storing, the selecting, and the removing until one or more exit criteria are met.

3. The computer-readable media of claim 2, where the one or more exit criteria correspond to a user defined number for the repeating or until no further repeating can be performed.

4. The computer-readable media of claim 2, where the one or more exit criteria correspond to a threshold value dependent on the one or more cluster validation criteria.

5. The computer-readable media of claim 2, storing one or more instructions for:
prompting a user input for selecting or inputting the one or more exit criteria.

6. The computer-readable media of claim 1, where the one or more cluster validation criteria corresponds to at least one of:
a maximum within a cluster pairwise distance,
a median within a cluster pairwise distance,
an average within a cluster pairwise distance,
a metric based on a ratio of a between cluster pairwise distance average and a within cluster pairwise distance average, or
an average silhouette width.

7. The computer-readable media of claim 6, storing one or more instructions for:
repeating the partitioning, the computing, the evaluating, the storing, the selecting, and the removing, and where the one or more cluster validation criteria corresponds to:
a metric based on a ratio, where a numerator includes one of:
the maximum within the cluster pairwise distance,
the median within the cluster pairwise distance,
the average within the cluster pairwise distance,
the metric based on the ratio of a between cluster pairwise distance average and a within pairwise distance average, or
the average silhouette width, and
a denominator that includes an average within a cluster pairwise distance.

8. The computer-readable media of claim 1, storing one or more instructions for:
prompting a user input for selecting or inputting the one or more cluster validation criteria.

9. The computer-readable media of claim 1, storing one or more instructions for:
removing each binary segmentation from the one or more additive sub-trees that cannot create a new partition from a subsequent repeating of the partitioning, the computing, the evaluating, the storing, the selecting, and the removing.

10. The computer-readable media of claim 1, where the additive tree corresponds to one of an evolutionary tree, a dendrogram, a cladogram, a phenogram, or a phylogram.

11. The computer-readable media of claim 1, where the data associated with the additive tree corresponds to biological sample data.

12. The computer-readable media of claim 1, where the data associated with the additive tree corresponds to biological sequence data including at least one of Deoxyribonucleic acid (DNA) data, Ribonucleic acid (RNA) data, or aminoacid data.

13. The computer-readable media of claim 1, where the data associated with the additive tree corresponds to gene expression data, single nucleotide polymorphism (SNP) mutation data, or data associated with a virus.

14. The computer-readable media of claim 1, where the selecting comprises one or more instructions for:
applying another one or more cluster validation criteria with respect to the at least one partition, when the at least one partition corresponds to two or more partitions;
selecting at least one partition from the two or more partitions that satisfies the other one or more cluster validation criteria; and
removing at least one of the binary segmentations from the one or more pairs of additive sub-trees that corresponds to the at least one partition associated with the two or more partitions.

15. The computer-readable media of claim 1, where the data associated with the additive tree corresponds to data where there is a similarity between members of the data.

16. The computer-readable media of claim 1, storing one or more instructions for:
receiving a user input indicating one or more outliers.

17. The computer-readable media of claim 1, storing one or more instructions for:
repeating the partitioning, the computing, the evaluating, the storing, the selecting, and the removing;
evaluating each of the optimal evaluation results during each repeating; and
selecting a global optimal evaluation result based on the evaluating of each of the optimal evaluation results.

18. The computer-readable media of claim 1, where the partitioning is performed on a first processor and one or more of the computing, the evaluating, the storing, the selecting, or the removing, is performed on a second processor.

19. The computer-readable media of claim 18, where the first processor and the second processor operate in a distributed processing environment.

20. The computer-readable media of claim 18, where the first processor and the second processor perform processing operations in parallel.

21. A computing device-implemented method, comprising:
receiving an additive tree;
assigning data associated with the additive tree to one or more initial clusters;

partitioning the additive tree into one or more pairs of additive sub-trees, where the one or more pairs of additive sub-trees correspond to one or more binary segmentations of the additive tree, where binary segmentation corresponds to a separation of data associated with the additive tree into two disjoint sets;

computing a set that includes partitions resulting from a combination of the one or more initial clusters and the one or more pairs of additive sub-trees;

evaluating one or more partitions of the set with one or more cluster validation criteria, where the one or more cluster validation criteria correspond to one or more metrics that evaluate one or more similarities between data associated with the one or more partitions of the set;

selecting at least one partition from the one or more partitions of the set that satisfies the one or more cluster validation criteria, where the at least one partition is associated with an optimal evaluation result relative to the other one or more evaluation results; and removing at least one of the binary segmentations from the one or more pairs of additive sub-trees that corresponds to the at least one partition.

22. The method of claim 21, further comprising:
repeating the partitioning, the computing, the evaluating, the storing, the selecting, and the removing until one or more exit criteria are met.

23. The method of claim 22, where the one or more exit criteria correspond to a user defined number of the repeating or until no further repeating can be performed.

24. The method of claim 22, where the one or more exit criteria correspond to a threshold value dependent on the one or more cluster validation criteria.

25. The method of claim 22, where the one or more cluster validation criteria corresponds to at least one of:
a maximum within a cluster pairwise distance,
a median within a cluster pairwise distance,
an average within a cluster pairwise distance,
a metric based on a ratio of a between cluster pairwise distance average and a within cluster pairwise distance average,
a metric based on a ratio of a between cluster pairwise distance average and a within cluster pairwise distance average, or
an average silhouette width.

26. The method of claim 22, further comprising:
removing each binary segmentation from the one or more additive sub-trees that cannot create a new partition from a subsequent repeating of the partitioning, the computing, the evaluating, the storing, the selecting, and the removing.

27. The method of claim 22, where the additive tree corresponds to one of an evolutionary tree, a dendrogram, a cladogram, a phenogram, or a phylogram.

28. The method of claim 22, where the data associated with the additive tree corresponds to biological sample data.

29. The method of claim 22, where the data associated with the additive tree corresponds to gene expression data, single nucleotide polymorphism (SNP) mutation data, or data associated with a virus.

30. The method of claim 22, further comprising:
receiving a user input indicating one or more outliers.

31. The method of claim 21, where the partitioning is performed on a first processor and one or more of the computing, the evaluating, the storing, the selecting, or the removing, is performed on a second processor.

32. The method of claim 31, where the first processor and the second processor operate in a distributed processing environment.

33. The method of claim 31, where the first processor and the second processor perform processing operations in parallel.

34. An apparatus comprising:
one or more memories to store instructions; and
one or more processors to execute the instructions to:
receive an additive tree;
assign data associated with the additive tree to one or more initial clusters;
partition the additive tree into one or more pairs of additive sub-trees, where the one or more pairs of additive sub-trees correspond to one or more binary segmentations of the additive tree, where binary segmentation corresponds to a separation of data associated with the additive tree into two disjoint sets;
compute a set that includes partitions resulting from a combination of the one or more initial clusters and the one or more pairs of additive sub-trees;
evaluate one or more partitions of the set with one or more cluster validation criteria, where the one or more cluster validation criteria correspond to one or more metrics that evaluate one or more similarities between data associated with the one or more partitions of the set;
store one or more evaluation results for the one or more partitions;
select at least one partition from the one or more partitions of the set that satisfies the one or more cluster validation criteria, where the at least one partition is associated with an optimal evaluation result relative to the other one or more evaluation results; and
remove at least one of the binary segmentations from the one or more pairs of additive sub-trees that corresponds to the at least one partition.

35. The apparatus of claim 34, where the one or more processors further execute one or more instructions to:
repeat the partitioning, the computing, the evaluating, the storing, the selecting, and the removing until one or more exit criteria are met.

36. The apparatus of claim 34, where the one or more exit criteria correspond to a user defined number of the repeating or until no further repeating can be performed.

37. The apparatus of claim 34, where the one or more exit criteria correspond to a threshold value dependent on the one or more cluster validation criteria.

38. The apparatus of claim 34, where the one or more processors further execute one or more instructions to:
prompt a user input for selecting or inputting the one or more exit criteria.

39. The apparatus of claim 34, where the one or more cluster validation criteria corresponds to at least one of:
a maximum within a cluster pairwise distance;
a median within a cluster pairwise distance; or
an average within a cluster pairwise distance.

40. The apparatus of claim 34, where the one or more cluster validation criteria corresponds to at least one of:
a metric based on a ratio of a between cluster pairwise distance average and a within cluster pairwise distance average; or
an average silhouette width.

41. The apparatus of claim 34, where the one or more processors further execute one or more instructions to:
remove each binary segmentation from the one or more additive sub-trees that cannot create a new partition from a subsequent repeating of the partitioning, the computing, the evaluating, the storing, the selecting, and the removing.

42. The apparatus of claim 34, where the additive tree corresponds to one of an evolutionary tree, a dendrogram, a cladogram, a phenogram, or a phylogram.

43. The apparatus of claim 34, where the data associated with the additive tree corresponds to biological sample data.

44. The apparatus of claim 34, where the data associated with the additive tree corresponds to biological sequence data including at least one of Deoxyribonucleic acid (DNA) data, Ribonucleic acid (RNA) data, or aminoacid data.

45. The apparatus of claim 34, where the data associated with the additive tree corresponds to gene expression data, single nucleotide polymorphism (SNP) mutation data, or data associated with a virus.

46. The apparatus of claim 34, where when selecting, the one or more processors further execute one or more instructions to:
apply another one or more cluster validation criteria with respect to the at least one partition, when the at least one partition corresponds to two or more partitions;
select at least one partition from the two or more partitions that satisfies the other one or more cluster validation criteria; and
remove at least one of the binary segmentations from the one or more pairs of additive sub-trees that corresponds to the at least one partition associated with the two or more partitions.

47. The apparatus of claim 34, where the one or more processors further execute one or more instructions to:
receive a user input indicating one or more outliers.

* * * * *